US010028256B2

(12) United States Patent
Tsuda

(10) Patent No.: US 10,028,256 B2
(45) Date of Patent: Jul. 17, 2018

(54) APPARATUS

(71) Applicant: SONY CORPORATION, Tokyo (JP)

(72) Inventor: Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/119,452

(22) PCT Filed: Jan. 8, 2015

(86) PCT No.: PCT/JP2015/050379
§ 371 (c)(1),
(2) Date: Aug. 17, 2016

(87) PCT Pub. No.: WO2015/129300
PCT Pub. Date: Sep. 3, 2015

(65) Prior Publication Data
US 2017/0026848 A1 Jan. 26, 2017

(30) Foreign Application Priority Data
Feb. 27, 2014 (JP) .................................. 2014-036867

(51) Int. Cl.
H04W 72/04 (2009.01)
H04W 16/14 (2009.01)
(Continued)

(52) U.S. Cl.
CPC ........... *H04W 72/04* (2013.01); *H04W 16/14* (2013.01); *H04W 48/16* (2013.01); *H04W 52/16* (2013.01);
(Continued)

(58) Field of Classification Search
CPC ......... H04W 72/0446; H04W 72/0453; H04W 72/04
See application file for complete search history.

(56) References Cited

U.S. PATENT DOCUMENTS 8,315,569 B2 * 11/2012 Harada ................. H04W 16/14
455/62
2013/0217406 A1 * 8/2013 Villardi ................. H04W 16/14
455/452.1
(Continued)

FOREIGN PATENT DOCUMENTS

JP 2007-184850 A 7/2007
JP 2013-034210 A 2/2013
WO 2013/096563 A1 6/2013

OTHER PUBLICATIONS

Yuichi Kanamori et al., "A Dynamic Spectrum Assignment in WiFi/WiMAX Integrated Network for Multimedia Services", IEICE Technical Report, Information and Communication Management, ISSN 0913-5685, vol. 109, No. 60, May 28-29, 2009, pp. 8.

(Continued)

Primary Examiner — Raj Jain
(74) Attorney, Agent, or Firm — Oblon, McClelland, Maier & Neustadt, L.L.P.

(57) ABSTRACT

[Object] To allow a wireless communication system to more appropriately use a frequency band to be shared between wireless communication of the wireless communication system and another wireless communication. [Solution] Provided is an apparatus including: an acquiring unit configured to acquire information regarding another wireless communication performed by a wireless communication apparatus using a frequency band to be shared between wireless communication of a wireless communication system and the another wireless communication, the information being provided by the wireless communication apparatus; and a control unit configured to determine an additional band available for the wireless communication of the wireless communication system in addition to a frequency band for the wireless communication system among (Continued)

the frequency band to be shared based on the information regarding the another wireless communication.

7 Claims, 19 Drawing Sheets

(51) Int. Cl.
*H04W 52/16* (2009.01)
*H04W 72/00* (2009.01)
*H04W 48/16* (2009.01)

(52) U.S. Cl.
CPC ....... *H04W 72/00* (2013.01); *H04W 72/0453* (2013.01)

(56) References Cited

U.S. PATENT DOCUMENTS

2017/0026848 A1* 1/2017 Tsuda .................... H04W 16/14
2017/0215084 A1* 7/2017 Futaki ................... H04W 16/14

OTHER PUBLICATIONS

Hiromasa Fujit et al., "Spectrum Sharing by Adaptive Transmit Power Control for Low Priority Systems and its Achievable Capacity", IEICE Technical Report, ISSN 0913-5685, vol. 107, No. 352, Nov. 26-27, 2007, pp. 8.

"Information and Communication Management", ISSN 0913-5685 IEICE Technical Report, The Institute of Electronics, Information and Communication Engineers, http://www.ieice.org/, vol. 109 No. 60, May 21, 2009, pp. 89-94.

Fujii, et al., "Spectrum Sharing by Adaptive Transmit Power Contorl for Low Priority Systems and its Achievable Capacity", ISSN 0913-5685 IEICE Technical Report, The Institute of Electronics, Information and Communication Engineers, http://www.ieice.org/, vol. 107 No. 352, Nov. 19, 2007, 15-20 pages.

* cited by examiner

FIG. 7
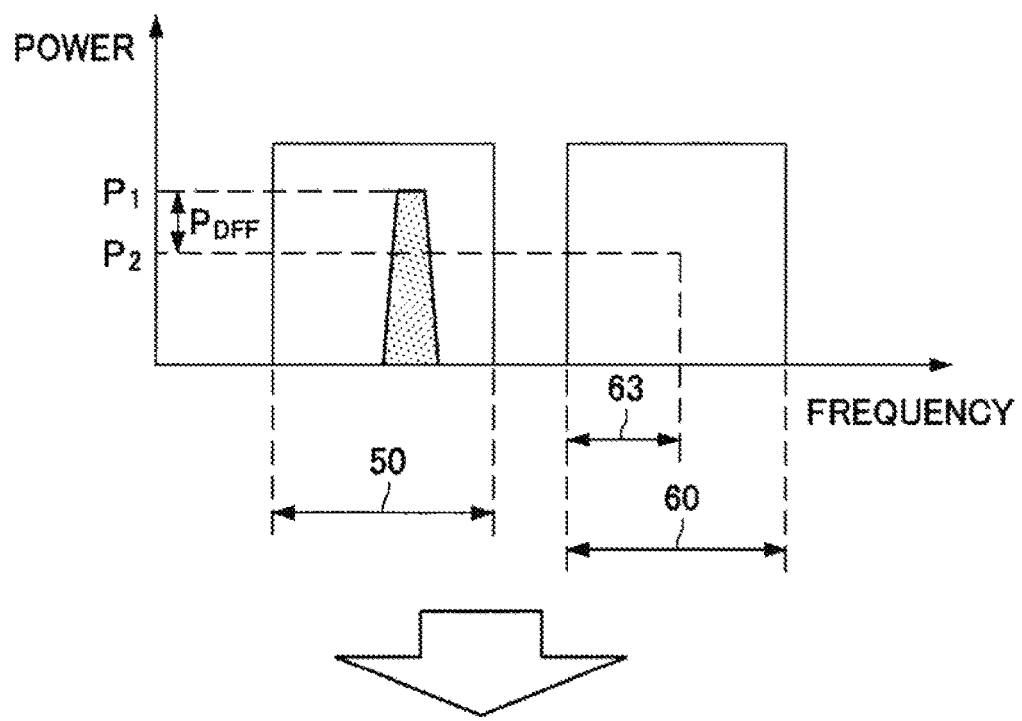
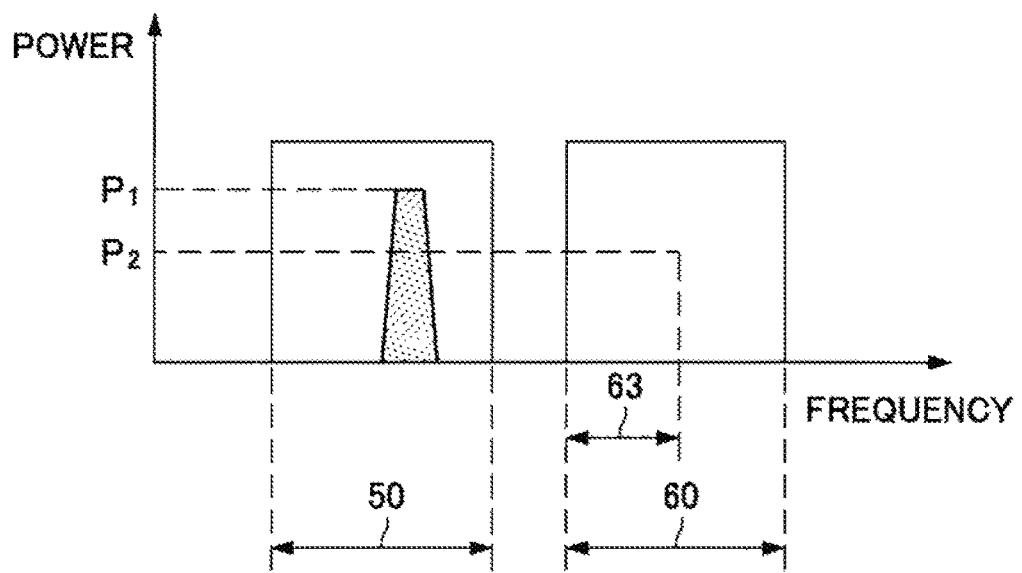

FIG. 8
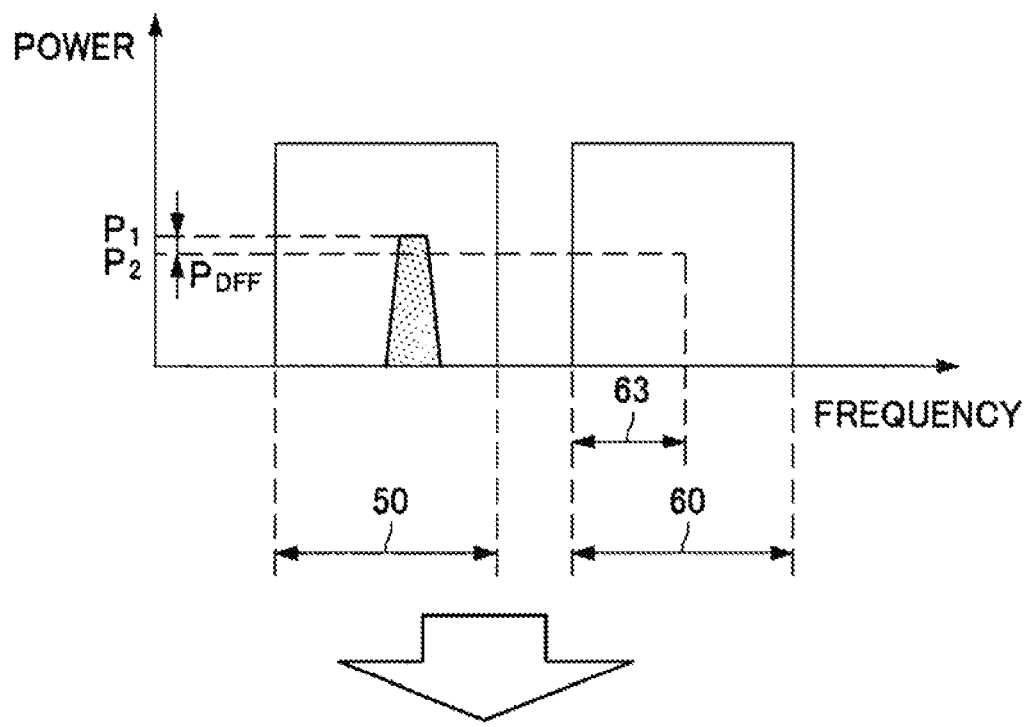
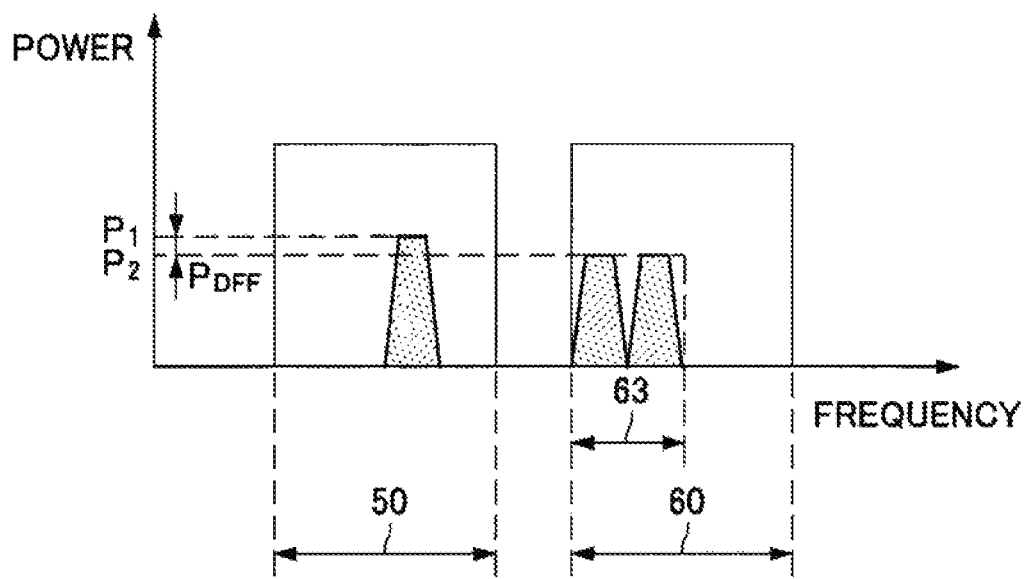

FIG. 9
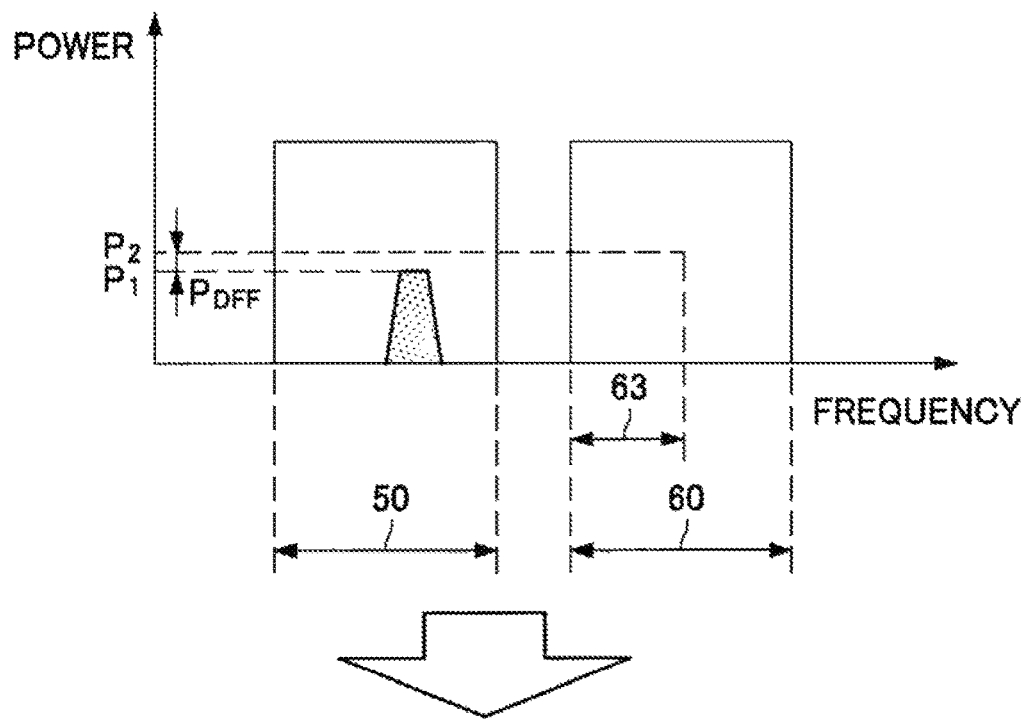
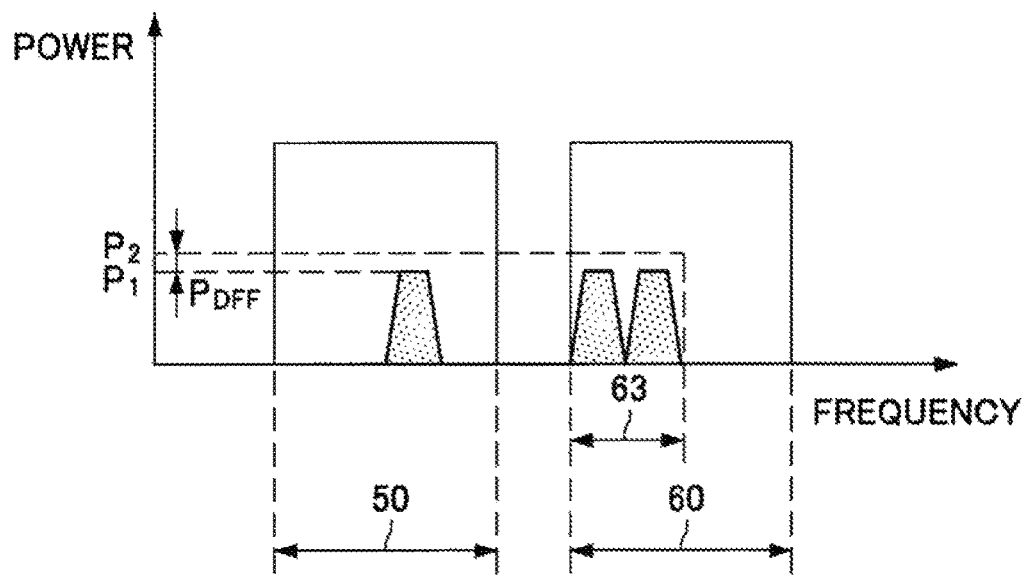

FIG. 11
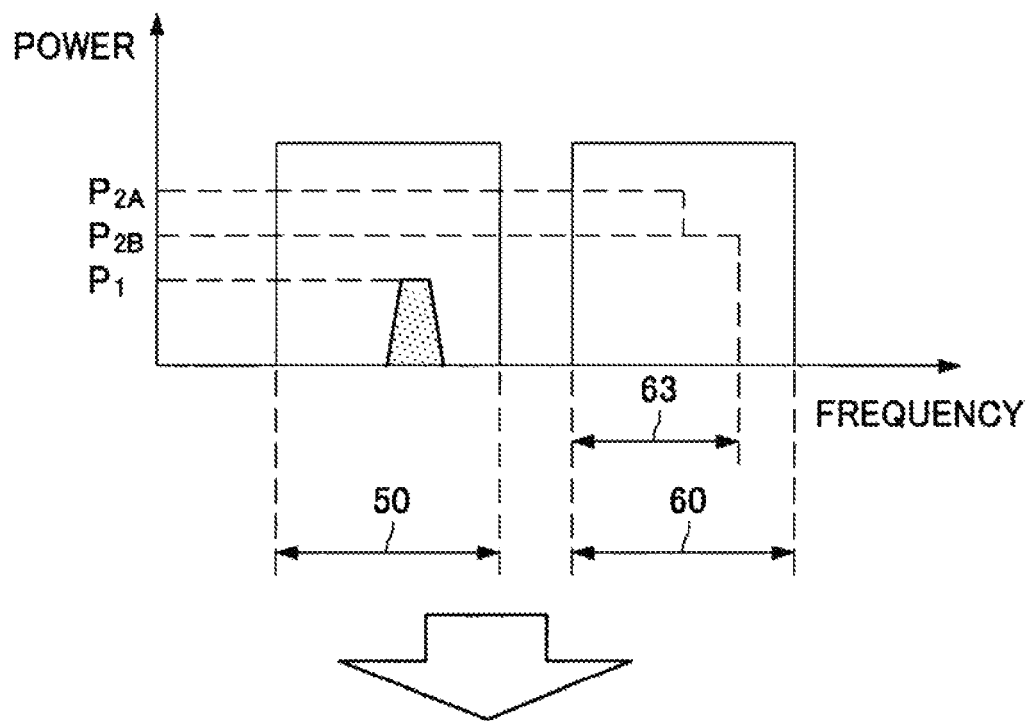
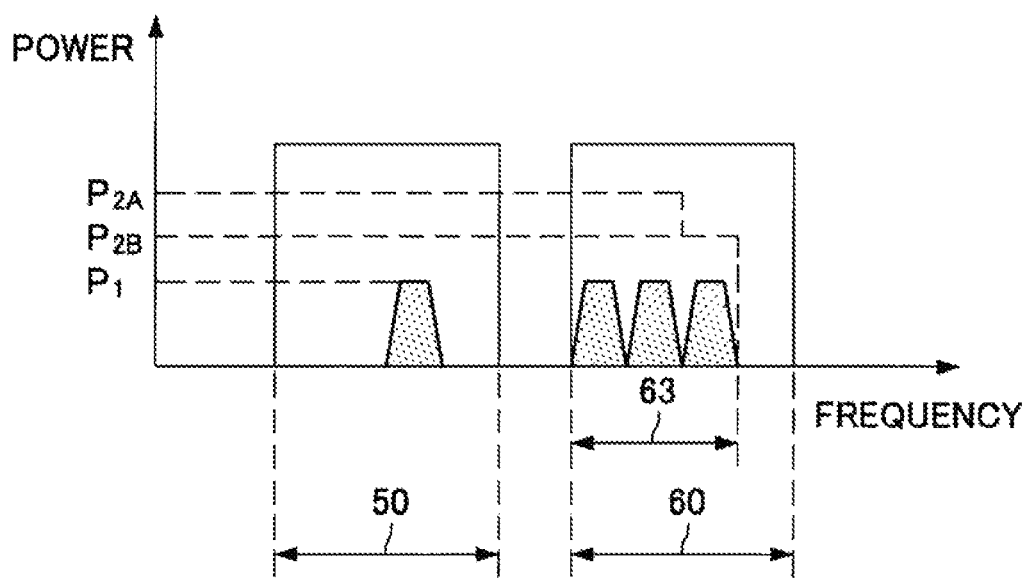

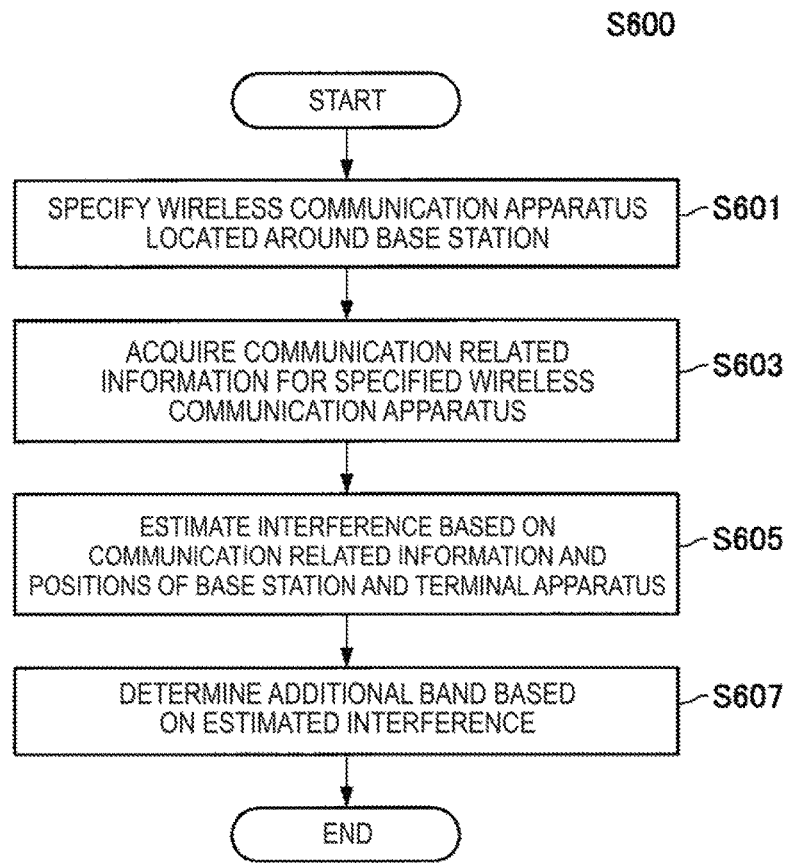
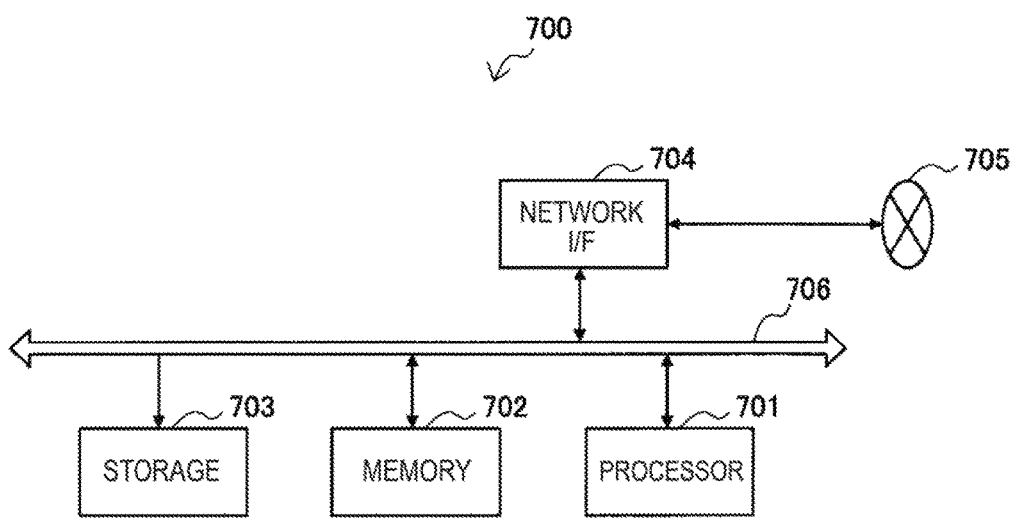

APPARATUS

CROSS REFERENCE TO RELATED APPLICATIONS

This application is a U.S. National Phase of International Patent Application No. PCT/JP2015/050379 filed on Jan. 8, 2015, which claims priority benefit of Japanese Patent Application No. JP 2014-036867 filed in the Japan Patent Office on Feb. 27, 2014. Each of the above-referenced applications is hereby incorporated herein by reference in its entirety.

TECHNICAL FIELD

The present disclosure relates to an apparatus.

BACKGROUND ART 3G mobile phone services called the third generation started in Japan in 2002. At first, small-sized packets were transmitted and received for transmission of voice calls and e-mail. The introduction of high speed downlink packet access (HSDPA), however, allowed larger-sized packets to be transmitted and received for downloading of music files and streaming of video. Services of long term evolution (LTE) also started with such an increase in the packet capacity, the services of LTE having orthogonal frequency division multiple access (OFDMA) used for downlinks to expand wireless networks. In addition, 4G services are going to start in around 2015. This may allow for up to 1 Gbps (bit per second) semi-fixedly and also up to 100 Mbps even in a moving environment. Further, for example, at a hot spot where traffic is locally concentrated, an access point of a wireless local area network (LAN) is provided to offload the traffic.

Further, for example, as a technique for effectively utilizing a frequency band, there is a cognitive radio technique.

For example, Patent Literature 1 discloses a technique of judging coverage of a first system based on a measurement value regarding the first system (for example, a broadcast system) and associated position information, and allowing a wireless communication apparatus not located within the coverage to use a frequency band. Further, for example, Patent Literature 2 discloses a technique of determining a frequency band to be used by wireless communication equipment based on a usage state of the frequency band detected by a detecting apparatus.

CITATION LIST

Patent Literature

Patent Literature 1: JP 2013-34210A
Patent Literature 2: JP 2007-184850A

SUMMARY OF INVENTION

Technical Problem

For example, a frequency band can be shared between wireless communication of a wireless communication system such as a cellular system and another wireless communication such as wireless communication of a wireless LAN.

However, with the techniques disclosed in Patent Literature 1 and Patent Literature 2, it can be difficult to appropriately determine use of the above-described frequency band by the above-described wireless communication system (for example, a cellular system). For example, because these techniques assume measurement/detection, when measurement/detection is not appropriately performed regarding the above-described another wireless communication (for example, wireless communication using a wireless LAN), use of the above-described frequency band is not appropriately determined. As an example, when coverage is narrow as in the wireless LAN, an apparatus which performs measurement/detection is not located within the coverage of the wireless LAN, measurement/detection is not performed, and use of the above-described frequency band by a cellular system can be determined without the wireless LAN being taken into account. As a result, when the above-described cellular system uses the above-described frequency band, the wireless communication of the cellular system can interfere with the wireless communication of the above-described wireless LAN. It should be noted that there is also a movable wireless LAN access point (for example, an access router), and, particularly, measurement/detection regarding such a wireless LAN access point can be missed.

Therefore, it is desirable to provide a mechanism for allowing a wireless communication system to more appropriately use a frequency band to be shared between wireless communication of the wireless communication system and another wireless communication.

Solution to Problem

According to the present disclosure, there is provided an apparatus including: an acquiring unit configured to acquire information regarding another wireless communication performed by a wireless communication apparatus using a frequency band to be shared between wireless communication of a wireless communication system and the another wireless communication, the information being provided by the wireless communication apparatus; and a control unit configured to determine an additional band available for the wireless communication of the wireless communication system in addition to a frequency band for the wireless communication system among the frequency band to be shared based on the information regarding the another wireless communication.

According to the present disclosure, there is provided an apparatus including: an acquiring unit configured to acquire information regarding another wireless communication performed by a wireless communication apparatus using a frequency band to be shared between wireless communication of a wireless communication system and the another wireless communication; and a providing unit configured to provide the information regarding the another wireless communication in a manner that another apparatus which determines an additional band available for the wireless communication of the wireless communication system in addition to a frequency band for the wireless communication system among the frequency band to be shared is able to acquire the information regarding the another wireless communication.

According to the present disclosure, there is provided an apparatus including: an acquiring unit configured to acquire information indicating an additional band available for wireless communication of a wireless communication system in addition to a frequency band for the wireless communication system among a frequency band to be shared between the wireless communication of the wireless communication system and another wireless communication; and a control unit configured to control a base station in a manner that the base station of the wireless communication system performs the wireless communication of the wireless communication system using the additional band. The additional band is a band determined based on information regarding the another wireless communication performed by a wireless communication apparatus using the frequency band to be shared, the information being provided by the wireless communication apparatus.

According to the present disclosure, there is provided an apparatus including: a control unit configured to control a wireless communication apparatus so as not to perform another wireless communication using an additional band while wireless communication of a wireless communication system is performed using the additional band available for the wireless communication of the wireless communication system among a frequency band to be shared between the wireless communication of the wireless communication system and the another wireless communication.

Advantageous Effects of Invention

As described above, according to the present disclosure, it is possible to allow a wireless communication system to more appropriately use a frequency band to be shared between wireless communication of the wireless communication system and another wireless communication. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 7 is an explanatory diagram for explaining a first example of relationship between transmission power of a cellular band and transmission power of an additional band.

FIG. 8 is an explanatory diagram for explaining a second example of relationship between transmission power of a cellular band and transmission power of an additional band.

FIG. 9 is an explanatory diagram for explaining a third example of relationship between transmission power of a cellular band and transmission power of an additional band.

FIG. 11 is an explanatory diagram for explaining a fifth example of relationship between transmission power of a cellular band and transmission power of an additional band.

FIG. 15 is a flowchart illustrating an example of schematic flow of additional band determination processing according to the embodiment.

FIG. 16 is a block diagram illustrating an example of a schematic configuration of a server.

DESCRIPTION OF EMBODIMENT

Hereinafter, a preferred embodiment of the present disclosure will be described in detail with reference to the appended drawings. In this specification and the drawings, components that have substantially the same function and structure are denoted with the same reference signs, and repeated explanation is omitted.

It should be noted that description will be provided in the following order.

Figure 1:
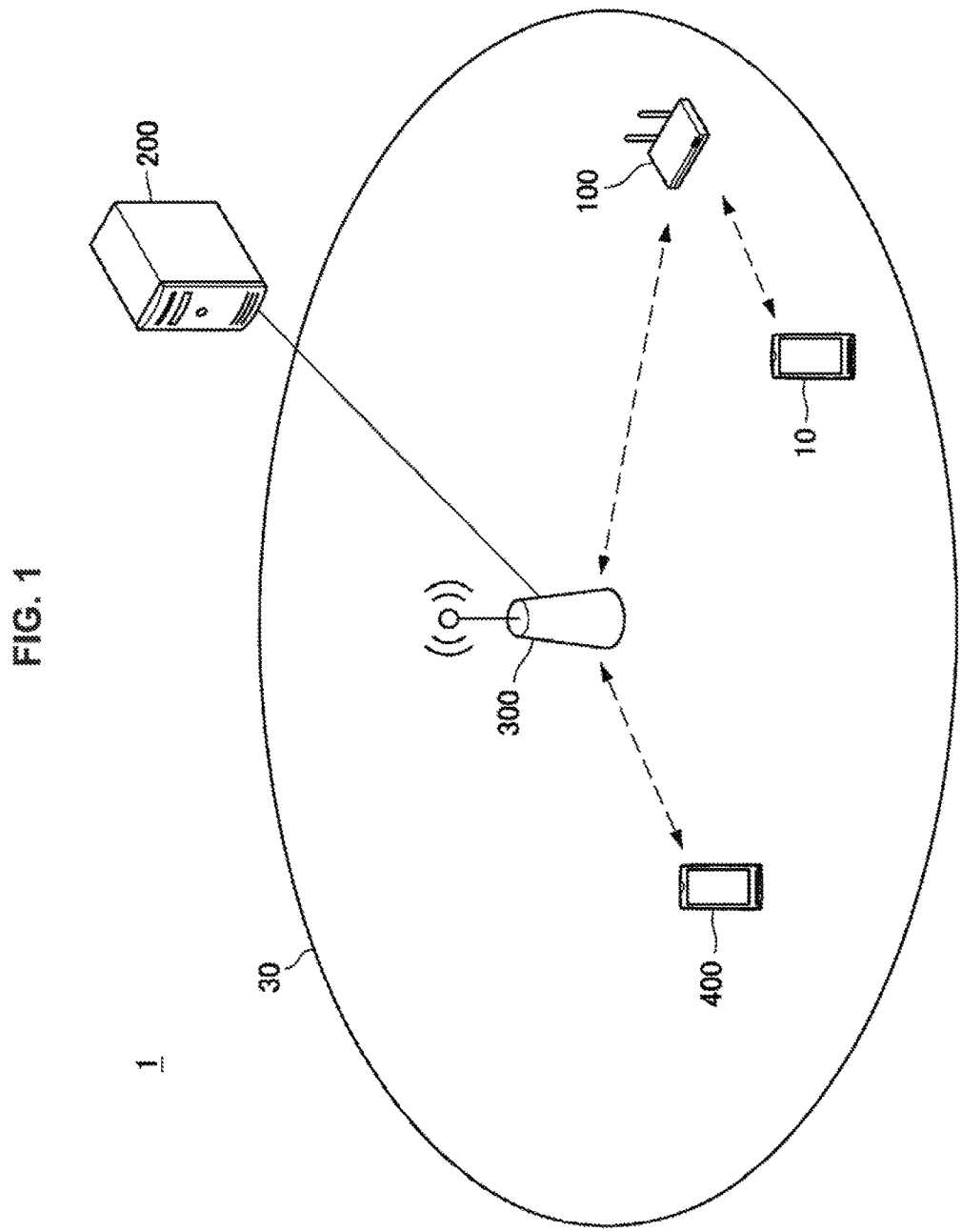
FIG. 1 is an explanatory diagram illustrating an example of a schematic configuration of a system according to an embodiment of the present disclosure.

1. Schematic Configuration of System
2. Configuration of Each Apparatus
2.1. Configuration of Wireless Communication Apparatus
2.2. Configuration of Information Processing Apparatus
2.3. Configuration of Base Station
2.4. Configuration of Wireless Communication Apparatus
3. Processing Flow
4. Application Examples
4.1. Application Examples for Information Processing Apparatus
4.2. Application Examples for Base Station
4.3. Application Examples for Wireless Communication Apparatus
5. Conclusion 1. Schematic Configuration of System First, a schematic configuration of a system 1 according to an embodiment of the present disclosure will be described with reference to FIG. 1 to FIG. 3. FIG. 1 is an explanatory diagram illustrating an example of a schematic configuration of the system 1 according to the present embodiment. Referring to FIG. 1, the system 1 includes a wireless communication apparatus 100, an information processing apparatus 200, a base station 300 and a wireless communication apparatus 400.

(Base Station 300)

The base station 300, which is a base station of a wireless communication system, performs wireless communication of the wireless communication system. The above-described wireless communication system is, for example, a cellular system. For example, the base station 300 performs wireless communication of the cellular system (hereinafter, referred to as "cellular communication") with the wireless communication apparatus 100 and the wireless communication apparatus 400.

(Wireless Communication Apparatus 400)

The wireless communication apparatus 400 performs wireless communication of the above-described wireless communication system (for example, a cellular system). For example, the wireless communication apparatus 400 performs cellular communication with the base station 300 when the wireless communication apparatus 400 is located within the cell 30.

It should be noted that the wireless communication apparatus 400 can perform another wireless communication different from the wireless communication of the above-described wireless communication system. The another wireless communication is, for example, wireless communication according to wireless LAN standards (hereinafter, referred to as "wireless LAN communication"). For example, the wireless communication apparatus 400 performs wireless LAN communication with another apparatus (which is not illustrated).

(Wireless Communication Apparatus 100)

The wireless communication apparatus 100 performs another wireless communication different from the wireless communication of the above-described wireless communication system (for example, a cellular system). The another wireless communication is, for example, wireless LAN communication. For example, the wireless communication apparatus 100 performs wireless LAN communication with another wireless communication apparatus (such as, for example, the wireless communication apparatus 10). It should be noted that the wireless LAN standards are any of, for example, IEEE802.11 series (such as, for example, IEEE802.11a, 11b, 11g, 11n, 11ac and 11ad).

Further, for example, the wireless communication apparatus 100 performs wireless communication of the above-described wireless communication system (for example, a cellular system). For example, the wireless communication apparatus 100 performs cellular communication with the base station 300 when the wireless communication apparatus 100 is located within the cell 30.

Further, for example, the wireless communication apparatus 100 operates as an access point. More specifically, for example, the wireless communication apparatus 100 operates as an access point of a wireless LAN. Further, the wireless communication apparatus 10 can perform communication via the wireless communication apparatus 100 (and the base station 300). The wireless communication apparatus 100 may be a mobile router, or a smartphone having a tethering function, or other types of apparatuses.

(Frequency Band to be Used)

A frequency band for the above-described wireless communication system and a frequency band to be shared between the wireless communication of the above-described wireless communication system and the above-described another wireless communication (hereinafter, referred to as a "shared band") are prepared. Specifically, for example, a frequency band for a cellular system (hereinafter, referred to as a "cellular band") and a shared band to be shared between the cellular communication and the wireless LAN communication are prepared. A specific example of this point will be described below with reference to FIG. 2 and FIG. 3.

Figure 2:
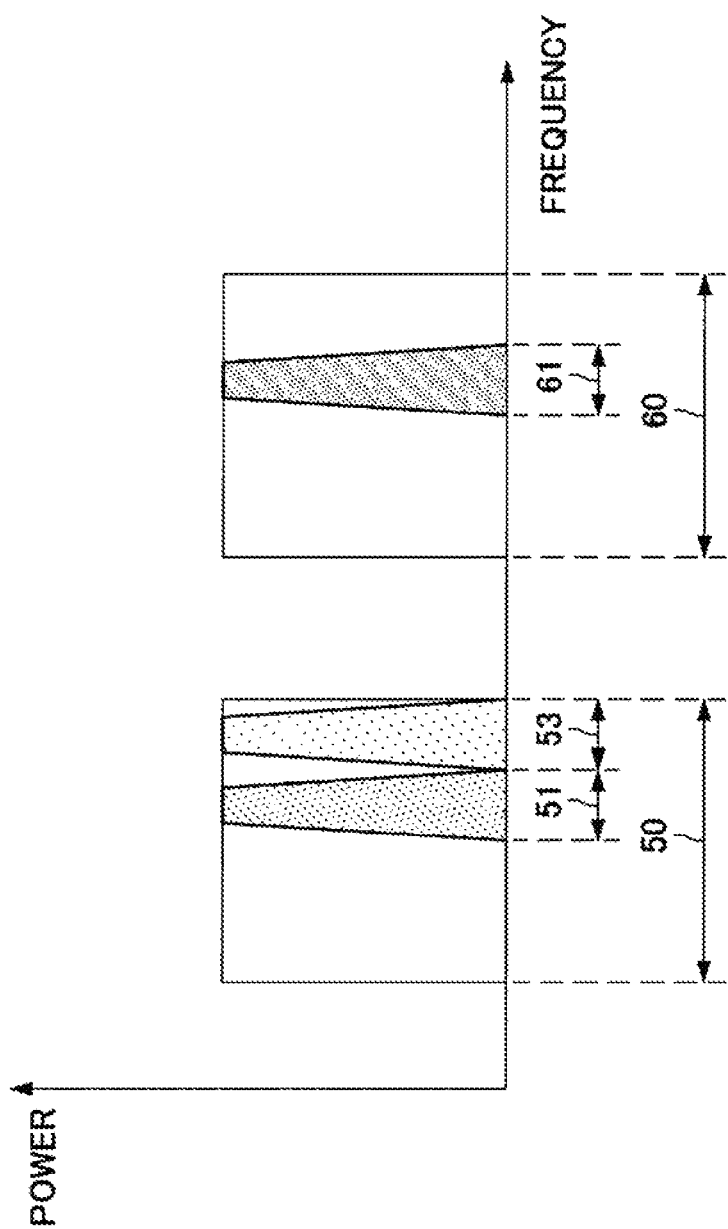
FIG. 2 is an explanatory diagram for explaining a first example of a frequency band to be used for wireless communication.

FIG. 2 is an explanatory diagram for explaining a first example of a frequency band to be used for wireless communication. Referring to FIG. 2, a cellular band 50 for a cellular system and a shared band 60 to be shared between the cellular communication and the wireless LAN communication are illustrated. The cellular band 50 is a band allocated to the cellular system. In this example, the cellular system employs time division duplex (TDD), and the cellular band 50 is a band for uplinks and downlinks. For example, the cellular band 50 includes a plurality of component carriers (CC). Further, the shared band 60 includes one or more channels of a wireless LAN. For example, the base station 300 and the wireless communication apparatus 400 perform cellular communication using a band 51 among the cellular band 50, and the base station 300 and the wireless communication apparatus 100 perform cellular communication using a band 53 among the cellular band 50. Each of the band 51 and the band 53 is, for example, a CC. Further, the wireless communication apparatus 100 and the wireless communication apparatus 10 perform wireless LAN communication using a band 61 among the shared band 60. The band 61 is, for example, a channel or part of a channel.

Figure 3:
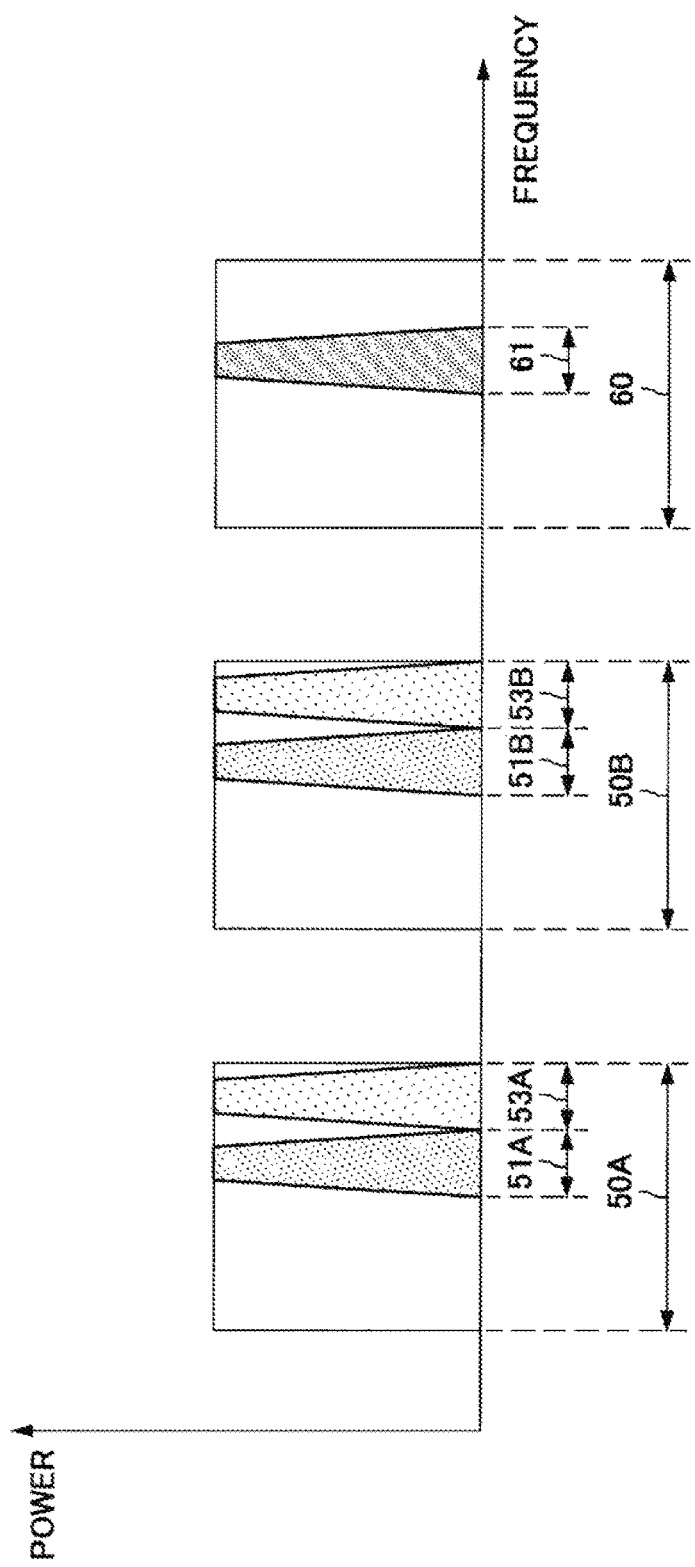
FIG. 3 is an explanatory diagram for explaining a second example of a frequency band to be used for wireless communication.

FIG. 3 is an explanatory diagram for explaining a second example of the frequency band to be used for wireless communication. Referring to FIG. 2, a cellular band 50A and a cellular band 50B for a cellular system, and a shared band 60 to be shared between the cellular communication and the wireless LAN communication are illustrated. The cellular bands 50A and 50B are bands allocated to the cellular system. In this example, the cellular system employs frequency division duplex (FDD), the cellular band 50A is an uplink band, and the cellular band 50B is a downlink band. For example, each of the cellular bands 50A and 50B includes a plurality of CCs. Further, the shared band 60 includes one or more channels of the wireless LAN. For example, the base station 300 and the wireless communication apparatus 400 perform uplink communication using a band 51A among the cellular band 50a and perform downlink communication using a band 51B among the cellular band 50B. Further, the base station 300 and the wireless communication apparatus 100 perform uplink communication using a band 53A among the cellular band 50A and perform downlink communication using a band 53B among the cellular band 50B. Each of the bands 51A, 51B, 53A and 53B is, for example, a CC. Further, the wireless communication apparatus 100 and the wireless communication apparatus 10 perform wireless LAN communication using a band 61 among the shared band 60. The band 61 is, for example, a channel or part of a channel.

Of course, the above-described frequency band for the above-described wireless communication system (for example, a cellular band) and the above-described shared band are not limited to the examples illustrated in FIG. 2 and FIG. 3. For example, the cellular band may include more bands. As an example, the cellular band may include each band of a 800 MHz band, a 1.5 GHz band and a 2.1 GHz band. Further, the shared band is not limited to a continuous band, and may include a discrete band.

It should be noted that, because the above-described shared band is shared between the cellular communication and the wireless LAN communication, it is desired that the cellular system uses the above-described shared band so as not to affect (for example, interfere with) the wireless LAN communication or so as to less affect the wireless LAN communication.

(Information Processing Apparatus 200)

The information processing apparatus 200 determines an additional band which can be used for wireless communication of the above-described wireless communication system in addition to the frequency band for the above-described wireless communication system among the above-described shared band. For example, the information processing apparatus 200 determines an additional band which can be used for cellular communication in addition to the cellular band among the shared band shared between the cellular communication and the wireless LAN communication. It should be noted that the base station 300 performs cellular communication using the additional band determined by the information processing apparatus 200.

Further, the information processing apparatus 200 may determine a band which can be used by individual base stations 300 for wireless communication of the above-described wireless communication system among the frequency band for the above-described wireless communication system. For example, the information processing apparatus 200 may determine a band which can be used by the individual base stations 300 for cellular communication among the cellular band. For example, the above-described wireless communication system may determine the above-described band for inter cell interference coordination (ICIC) by employing a heterogeneous network (HetNet).

2. Configuration of Each Apparatus

Subsequently, a configuration of each apparatus according to the embodiment of the present disclosure will be described with reference to FIG. 4 to FIG. 12.

2.1. Configuration of Wireless Communication Apparatus

Figure 4:
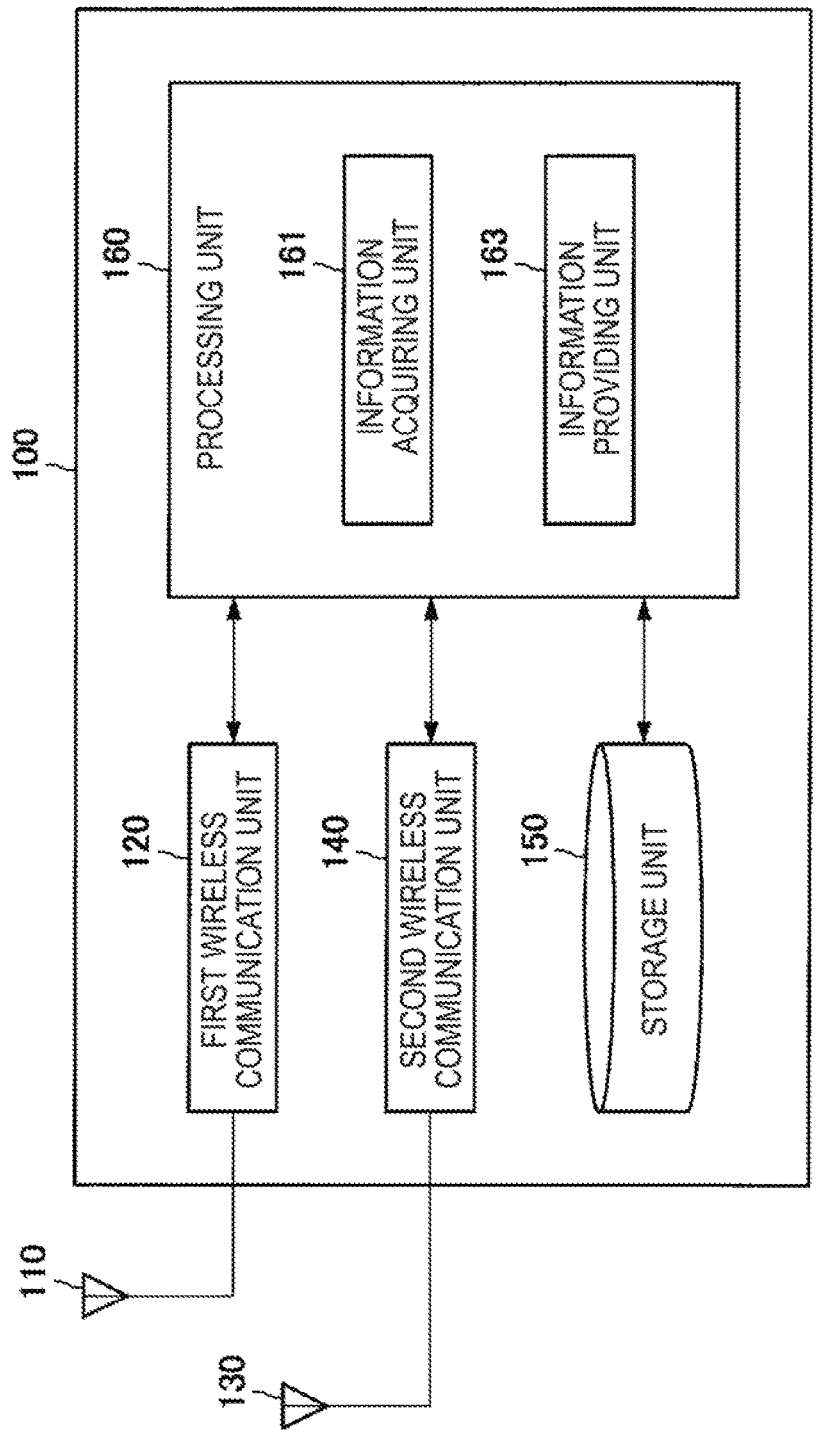
FIG. 4 is a block diagram illustrating an example of a configuration of a wireless communication apparatus according to the embodiment.

First, an example of the configuration of the wireless communication apparatus 100 according to the present embodiment will be described with reference to FIG. 4. FIG. 4 is a block diagram illustrating an example of the configuration of the wireless communication apparatus 100 according to the present embodiment. The wireless communication apparatus 100 includes an antenna unit 110, a first wireless communication unit 120, an antenna unit 130, a second wireless communication unit 140, a storage unit 150 and a processing unit 160.

(Antenna Unit 110)

The antenna unit 110 emits a signal into the space as a radio wave, the signal being output by the first wireless communication unit 120. The antenna unit 110 also converts a radio wave in the space into a signal, and outputs the signal to the first wireless communication unit 120.

(First Wireless Communication Unit 120)

The first wireless communication unit 120 transmits and receives a signal in wireless communication of the wireless communication system. For example, the wireless communication system is a cellular system, and the first wireless communication unit 120 transmits and receives a signal in the cellular communication. Specifically, for example, the first wireless communication unit 120 receives a downlink signal from the base station 300 and transmits an uplink signal to the base station 300.

(Antenna Unit 130)

The antenna unit 130 emits a signal into the space as a radio wave, the signal being output by the second wireless communication unit 140. The antenna unit 130 also converts a radio wave in the space into a signal, and outputs the signal to the second wireless communication unit 140.

(Second Wireless Communication Unit 140)

The second wireless communication unit 140 transmits and receives a signal in another wireless communication different from the wireless communication of the wireless communication system. For example, the above-described another wireless communication is wireless communication according to wireless LAN standards, and the second wireless communication unit 140 transmits and receives a signal in the wireless LAN communication. Specifically, for example, the second wireless communication unit 140 receives a signal from the wireless communication apparatus 10 and transmits a signal to the wireless communication apparatus 10.

(Storage Unit 150)

The storage unit 150 temporarily or persistently stores a program and data for operation of the wireless communication apparatus 100.

(Processing Unit 160)

The processing unit 160 provides various functions of the wireless communication apparatus 100. The processing unit 160 includes an information acquiring unit 161 and an information providing unit 163. It should be noted that the processing unit 160 can further include components other than these components. That is, the processing unit 160 can also perform operation other than operation of these components.

(Information Acquiring Unit 161)

(a) Acquisition of Communication Related Information

The information acquiring unit 161 acquires information regarding the above-described another wireless communication (hereinafter, referred to as "communication related information") performed by the wireless communication apparatus 100 using a frequency band (that is, a shared band) to be shared between the wireless communication of the wireless communication system and the another wireless communication.

As described above, for example, the above-described wireless communication system is a cellular system, and the above-described another wireless communication is wireless LAN communication. That is, the information acquiring unit 161 acquires information regarding the wireless LAN communication (that is, communication related information) performed by the wireless communication apparatus 100 using a shared band (a shared band to be shared between the cellular communication and the wireless LAN communication).

Use Band Information

For example, the above-described communication related information is information (hereinafter, referred to as "use band information") indicating a band used by the wireless communication apparatus 100 among the above-described shared band.

For example, the above-described shared band is one or more channels of the wireless LAN communication, and the above-described use band information indicates a band used by the wireless communication apparatus 100 among the above-described one or more channels. It should be noted that the above-described band indicated by the above-described use band information may be a band in unit of channel of the wireless LAN or may be a band in unit finer than a channel.

According to such use band information, for example, it is possible to specify a band being used by the wireless communication apparatus 100 (or a band which is not used by the wireless communication apparatus 100).

Transmission Power Information

For example, the above-described communication related information includes information indicating transmission power of the wireless communication apparatus 100 regarding the above-described shared band (hereinafter, referred to as "transmission power information"). For example, the above-described use band information indicates transmission power for each band used by the wireless communication apparatus 100 among the shared band. According to such use band information, for example, it is possible to estimate a communication area of the wireless communication apparatus 100 and received power, or the like, of a signal transmitted by the wireless communication apparatus 100.

Others

It should be noted that the above-described communication related information may include other information in addition to the above-described use band information and/or the above-described transmission power information or in place of the above-described use band information and/or the above-described transition power information.

As an example, the above-described communication related information may include information indicating whether or not the wireless communication apparatus 100 uses the above-described shared band. According to such information, for example, it is possible to convey whether or not the above-described shared band is used with a smaller information amount. As an example, when a state of the above-described another wireless communication (for example, wireless LAN communication) of the wireless communication apparatus 100 is a sleep state/a dormant state, such information can be particularly effective.

As another example, the above-described communication related information may include communication parameters other than the band used by the wireless communication apparatus 100 and transmission power of the wireless communication apparatus 100. The communication parameters may include a communication scheme to be employed. Further, the above-described communication parameter may be information regarding whether or not there is frequency hopping. Further, the above-described communication parameters may include a time interval at which the state of the wireless communication apparatus 100 is put into a sleep state/a dormant state.

(b) Position Specifying Information

For example, the information acquiring unit 161 further acquires position specifying information for specifying a position of the wireless communication apparatus 100.

GPS Information

For example, the above-described position specifying information includes information generated by a global positioning system (GPS) function of the wireless communication apparatus 100 (hereinafter, referred to as "GPS information"). In this case, the wireless communication apparatus 100 further includes a GPS function, and the information acquiring unit 161 acquires the GPS information generated by the GPS function. According to such GPS information, for example, it is possible to specify a detailed position of the wireless communication apparatus 100.

Cell ID

The above-described position specifying information may include identification information of a cell of the wireless communication system in which the wireless communication apparatus 100 is located in place of the above-described GPS information or along with the above-described GPS information. The above-described wireless communication system is a cellular system, and the above-described identification information may be a cell ID. According to such identification information, for example, it is possible to at least specify a cell in which the wireless communication apparatus 100 is located.

Received Power Information

The above-described position specifying information may include information regarding the received power of a signal at the wireless communication apparatus 100, the signal being transmitted by a plurality of base stations of the above-described wireless communication system (hereinafter, referred to as "received power information") in place of the above-described GPS information and/or the above-described identification information or along with the above-described GPS information and/or the above-described identification information. In this case, the above-described received power information may be generated through measurement by the wireless communication apparatus 100, and the information acquiring unit 161 may acquire the generated received power information. For example, the received power information may be received power of a cell-specific reference signal (CRS) transmitted by the above-described plurality of base stations, and, more specifically, may be reference signal received power (RSRP). Alternatively, the received power information may be received power of a pilot signal transmitted by the above-described plurality of base stations, and, more specifically, may be received signal code power (RSCP). According to such received power information, for example, it is possible to estimate a detailed position of the wireless communication apparatus 100 using the positions of the above-described plurality of base stations. That is, the more detailed position of the wireless communication apparatus 100 can be specified.

(Information Providing Unit 163)

(a) Provision of Communication Related Information

The information providing unit 163 provides the above-described communication related information so that the information processing apparatus 200 can acquire the above-described communication related information.

Providing Method

As a first example, the information providing unit 163 provides the above-described communication related information to the information processing apparatus 200 by way of the base station of the above-described wireless communication system. The base station may be the base station 300 or other base stations. Specifically, for example, the information providing unit 163 provides the above-described communication related information to the information processing apparatus 200 by transmitting a message including the above-described communication related information via a first wireless communication unit 120, the message being addressed to the information processing apparatus 200.

As a second example, the information providing unit 163 may provide the above-described communication related information to the above-described base station, and the base station may provide the above-described communication related information to the information processing apparatus 200. In this case, the above-described base station may perform any processing on the above-described communication related information and may provide the communication related information subjected to the processing to the information processing apparatus 200. Further, the above-described base station may integrate the communication related information from one or more wireless communication apparatuses 100 and provide the integrated communication related information to the information processing apparatus 200.

It should be noted that the information providing unit 163 may provide the above-described communication related information to the information processing apparatus 200 via other routes (for example, via an access point of a wireless LAN) instead of providing the information by way of the base station of the above-described wireless communication system.

Providing Timing

For example, the information providing unit 163 provides the above-described communication related information with a predetermined period. The predetermined period may be a fixed period or a variable period.

It should be noted that the information providing unit 163 may provide the above-described communication related information in response to occurrence of a predetermined event instead of providing the information with the predetermined period or in addition to providing the information with the predetermined period. As an example, the above-described predetermined event may be change of the above-described communication related information to a degree exceeding a predetermined degree (for example, change of a band used by the wireless communication apparatus 100 or change of transmission power of the wireless communication apparatus 100 to a degree exceeding a predetermined range). According to such a timing, for example, it is possible to provide the above-described communication related information as necessary.

Providing Period

For example, the information providing unit 163 provides the above-described communication related information only while the wireless communication apparatus 100 uses the above-described shared band.

As described above, the above-described communication related information is provided to the information processing apparatus 200. By this means, for example, the information processing apparatus 200 can know a state of wireless communication of the wireless communication apparatus 100. Therefore, the information processing apparatus 200 can estimate influence to be provided to another wireless communication (for example, wireless LAN communication) by the wireless communication apparatus 100 due to use of the shared band by the wireless communication system (for example, a cellular system).

(b) Provision of Position Specifying Information

For example, the information providing unit 163 provides the above-described position specifying information so that the information processing apparatus 200 can specify the position of the wireless communication apparatus 100.

Providing Method

As a first example, the information providing unit 163 provides the above-described position specifying information to the information processing apparatus 200 by way of the base station of the above-described wireless communication system. The base station may be the base station 300 or other base stations. Specifically, for example, the information providing unit 163 provides the above-described position specifying information to the information processing apparatus 200 by transmitting a message including the above-described position specifying information via a first wireless communication unit 120, the message being addressed to the information processing apparatus 200.

As a second example, the information providing unit 163 may provide the above-described position specifying information to the above-described base station. The base station may be the base station 300 or other base stations. The above-described base station may provide the above-described position specifying information to the information processing apparatus 200. Alternatively, the above-described base station may specify the position of the wireless communication apparatus 100 from the above-described position specifying information and provide information indicating the specified position to the information processing apparatus 200. Further, the above-described base station may integrate position specifying information from one or more wireless communication apparatuses 100 and provide the integrated position specifying information to the information processing apparatus 200.

Providing Timing

For example, the information providing unit 163 provides the above-described position specifying information with a predetermined period. The predetermined period may be a fixed period or a variable period.

It should be noted that the information providing unit 163 may provide the above-described communication related information in response to occurrence of a predetermined event instead of providing the information with the above-described predetermined period or along with providing the information with the above-described predetermined period. As an example, the above-described predetermined event may be change of the above-described position specifying information to a degree exceeding a predetermined degree (for example, change of the GPS information by an amount exceeding a predetermined amount or change of the cell ID). In this case, as a grain size of the above-described position specifying information is finer, a frequency of provision of the above-described position specifying information can become higher. According to such a timing, for example, it is possible to provide the above-described position specifying information as necessary.

Providing Period

For example, the information providing unit 163 provides the above-described position specifying information only while the wireless communication apparatus 100 uses the above-described shared band.

Relationship with Provision of Communication Related Information

It should be noted that, for example, the above-described position specifying information is provided along with the above-described communication related information. More specifically, for example, a message including the above-described position specifying information and the above-described communication related information is transmitted by the wireless communication apparatus 100. It should be noted that the above-described position specifying information may be provided separately from the above-described communication related information.

As described above, the above-described position specifying information is provided to the information processing apparatus 200. By this means, for example, the information processing apparatus 200 can know the position of the wireless communication apparatus 100. Therefore, the information processing apparatus 200 can estimate influence to be provided to another wireless communication (for example, wireless LAN communication) by the wireless communication apparatus 100 due to use of the shared band by individual base stations of the wireless communication system (for example, a cellular system).

An example of the configuration of the wireless communication apparatus 100 has been described above. It should be noted that the wireless communication apparatus 100 (processing unit 160) may further include components (for example, a first control unit 461 and a second control unit 463) of the wireless communication apparatus 400.

2.2. Configuration of Information Processing Apparatus

Figure 5:
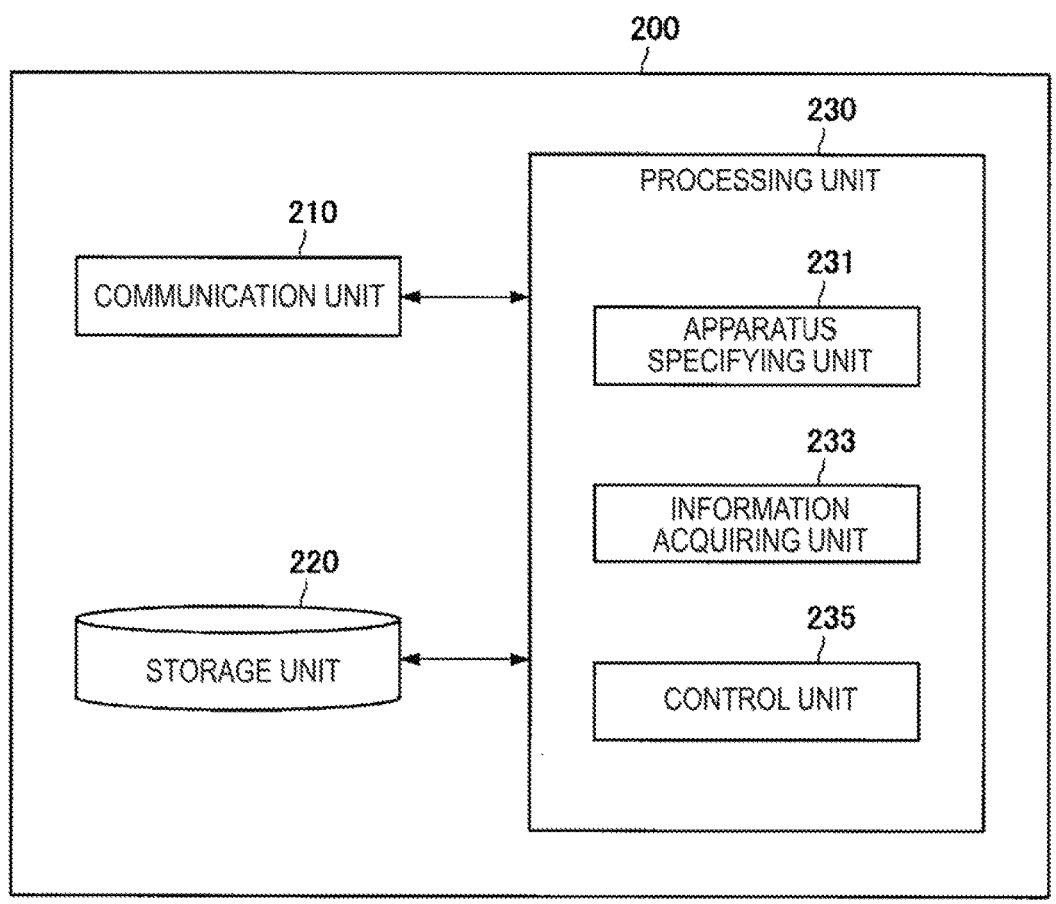
FIG. 5 is a block diagram illustrating an example of a configuration of a wireless communication apparatus according to the embodiment.

An example of the configuration of the information processing apparatus 200 according to the present embodiment will be described next with reference to FIG. 5. FIG. 5 is a block diagram illustrating an example of the configuration of the information processing apparatus 200 according to the present embodiment. The information processing apparatus 200 includes a communication unit 210, a storage unit 220 and a processing unit 230.

(Communication Unit 210)

The communication unit 210 communicates with other apparatuses. For example, the communication unit 210 communicates with the base station 300. Further, for example, the communication unit 210 communicates with the wireless communication apparatus 100 (and the wireless communication apparatus 400) via the base station 300. Further, the communication unit 210 may communicate with any core network node (such as, for example, a serving gateway (S-GW), a packet data network gateway (P-GW) and/or mobility management entity (MME)) of the cellular system.

(Storage Unit 220)

The storage unit 220 temporarily or persistently stores a program and data for operation of the information processing apparatus 200.

(Processing Unit 230)

The processing unit 230 provides various functions of the information processing apparatus 200. The processing unit 230 includes an apparatus specifying unit 231, an information acquiring unit 233 and a control unit 235. It should be noted that the processing unit 230 can further include components other than these components.

(Apparatus Specifying Unit 231)

(a) Specification of Wireless Communication Apparatus 100 Located Around Base Station 300

The apparatus specifying unit 231 specifies the wireless communication apparatus 100 located around the base station 300 based on the position of the wireless communication apparatus 100.

Method for Specifying Position of Wireless Communication Apparatus 100

As described above, for example, the wireless communication apparatus 100 provides the above-described position specifying information (that is, information for specifying the position of the wireless communication apparatus 100) so that the information processing apparatus 200 can specify the position of the wireless communication apparatus 100. The processing unit 230 (for example, the apparatus specifying unit 231 or other components) then specifies the position of the wireless communication apparatus 100.

It should be noted that the wireless communication system itself may specify the position of the wireless communication apparatus 100 instead of specifying the position of the wireless communication apparatus 100 based on the information provided by the wireless communication apparatus 100. For example, the base station to which the wireless communication apparatus 100 is connected (for example, the base station 300) may specify the position (detailed position) of the wireless communication apparatus 100 using a technique such as timing advance (TA) and angle of arrival (AoA). Alternatively, the wireless communication system may specify a cell of the base station to which the wireless communication apparatus 100 is connected as the position of the wireless communication apparatus 100.

Method for Specifying Wireless Communication Apparatus 100 Located Around Base Station 300

Case where More Detailed Position than Cell can be Specified

For example, a more detailed position than a cell is specified as the position of the wireless communication apparatus 100. For example, when the above-described position specifying information includes the above-described GPS information or the above-described received power information, a more detailed position than the cell is specified as the position of the wireless communication apparatus 100.

In such a case, for example, the apparatus specifying unit 231 specifies the wireless communication apparatus 100 located around the base station 300 based on the position of the wireless communication apparatus 100 and the position of the base station 300. More specifically, for example, the apparatus specifying unit 231 specifies the wireless communication apparatus 100 located within a region having a predetermined size centered at the position of the base station 300 as the wireless communication apparatus 100 located around the base station 300. The above-described region having the predetermined size is, for example, a region having a predetermined shape (for example, a circle, an ellipse or a rectangle) having a predetermined size (for example 5 km$^2$) centered at the position of the base station 300. The region may change for each shared band.

It should be noted that, for example, the information indicating the position of the base station 300 is provided by the base station 300 and stored in the storage unit 220.

Case where Cell can be Specified

A cell in which the wireless communication apparatus 100 is located may be specified as the position of the wireless communication apparatus 100. For example, when the above-described position specifying information includes only the above-described cell ID, the cell may be specified as the position of the wireless communication apparatus 100.

In such a case, for example, the apparatus specifying unit 231 may specify the wireless communication apparatus 100 located within the cell 30 of the base station 300 (that is, the wireless communication apparatus 100 providing the cell ID of the base station 300) as the wireless communication apparatus 100 located around the base station 300. Alternatively, the wireless communication apparatus 100 located in the cell 30 of the base station 300 and a cell adjacent to the cell 30 (which is not illustrated) may be specified as the wireless communication apparatus 100 located around the base station 300.

(b) Specification of Another Wireless Communication Apparatus Located Around Base Station 300

For example, the apparatus specifying unit 231 specifies another wireless communication apparatus located around the base station 300 based on the position of the above-described another wireless communication apparatus which performs the above-described another wireless communication (for example, wireless LAN communication) using the above-described shared band.

Method for Specifying Position of Another Wireless Communication Apparatus

For example, information for specifying the position of the above-described another wireless communication apparatus is collected in advance and stored (for example, in the storage unit 220). The processing unit 230 (for example, the apparatus specifying unit 231 or other components) then specifies the position of the above-described another wireless communication apparatus. It should be noted that the above-described another wireless communication is, for example, wireless LAN communication, and the above-described another wireless communication apparatus is, for example, an access point of wireless LAN.

Method for Specifying Another Wireless Communication Apparatus Located Around Base Station 300

A method for specifying the above-described another wireless communication apparatus located around the base station 300 is, for example, the same as any of the above-described examples of the method for specifying the wireless communication apparatus 100 located around the base station 300. Therefore, overlapped explanation will be omitted here.

(Information Acquiring Unit 233)
(a) Acquisition of Communication Related Information of Wireless Communication Apparatus 100

The information acquiring unit 233 acquires information regarding another wireless communication performed by the wireless communication apparatus 100 using a frequency band to be shared (that is, a shared band) between the wireless communication of the wireless communication system and the above-described another wireless communication, the information being provided by the wireless communication apparatus 100 (that is, communication related information).

Content of Communication Related Information

As described above, for example, the above-described wireless communication system is a cellular system, and the above-described another wireless communication is wireless LAN communication. That is, the information acquiring unit 233 acquires information regarding wireless LAN communication (that is, communication related information) performed by the wireless communication apparatus 100 using a shared band (a band to be shared between the cellular communication and the wireless LAN communication).

Further, as described above, for example, the above-described communication related information includes information indicating a band used by the wireless communication apparatus 100 among the above-described shared band (that is, use band information). Further, for example, the above-described communication related information includes information indicating transmission power of the wireless communication apparatus 100 for the above-described shared band (that is, transmission power information). It should be noted that the above-described communication related information may include other information in addition to the above-described use band information and/or the above-described transmission power information or in place of the above-described use band information and/or the above-described transmission power information. These points are as described above.

Method for Acquiring Communication Related Information

As described above, for example, the above-described communication related information is provided to the information processing apparatus 200 by the wireless communication apparatus 100 (or the base station of the wireless communication system). The communication related information is then stored in the storage unit 220. At any timing after that, the information acquiring unit 233 acquires the above-described communication related information from the storage unit 220.

Further, for example, as described above, the above-described communication related information is routed through the base station of the above-described wireless communication system (for example, a cellular system). By this means, for example, the information processing apparatus 200 can acquire the above-described communication related information even when the wireless communication apparatus 100 moves.

It should be noted that the information acquiring unit 233, for example, acquires the above-described communication related information regarding the wireless communication apparatus 100 located around the base station 300 (that is, the wireless communication apparatus 100 specified by the apparatus specifying unit 231).

(b) Acquisition of Information Regarding Another Wireless Communication Apparatus For example, the information acquiring unit 233 acquires information regarding the above-described another wireless communication (for example, wireless LAN communication) performed by the above-described another wireless communication apparatus using the above-described shared band.

Content of Information

The above-described information regarding the above-described another wireless communication (for example, wireless LAN communication) performed by the above-described another wireless communication apparatus is the same information (such as, for example, use band information, transmission power information and/or other communication parameters) as the above-described communication related information regarding the wireless communication apparatus 100. Therefore, overlapped explanation will be omitted here.

Method for Acquiring Information

For example, the above-described information regarding the above-described another wireless communication performed by the above-described another wireless communication apparatus is provided by the above-described another wireless communication apparatus and collected (for example, by the information processing apparatus 200). For example, the information is stored in the storage unit 220. At any timing after that, the information acquiring unit 233 acquires the above-described information from the storage unit 220.

(Control Unit 235)
(a) Determination of Additional Band

The control unit 235 determines an additional band which can be used for the above-described wireless communication of the above-described wireless communication system in addition to a frequency band for the above-described wireless communication system among the above-described shared band based on the above-described communication related information.

As described above, for example, the above-described wireless communication system is a cellular system, and the above-described another wireless communication is wireless LAN communication. That is, the control unit 235 determines an additional band which can be used for the cellular communication in addition to the cellular band among the above-described shared band based on the above-described communication related information.

Determination in Unit of Base Station

As described above, the above-described communication related information is information regarding the above-described another wireless communication (for example, wireless LAN communication) performed by the wireless communication apparatus 100 using the above-described shared band. For example, the wireless communication apparatus 100 here is an apparatus located around the base station 300. Further, for example, the additional band is a band which can be used for wireless communication of the base station 300. That is, the control unit 235 determines the additional band which can be used for wireless communication of the base station 300 among the above-described additional band based on the above-described communication related information regarding the wireless communication apparatus 100 located around the base station 300.

According to such determination of the additional band in unit of base station, for example, it is possible to use the additional band for wireless communication (for example, cellular communication) of the wireless communication system more flexibly.

Determination of Transmission Power

For example, the control unit 235 determines the above-described additional band and transmission power which can be used for the additional band based on the above-described communication related information.

For example, the control unit 235 determines maximum transmission power which can be used as the above-described transmission power which can be used.

Further, for example, the above-described additional band includes a plurality of bands, and the control unit 235 determines transmission power which can be used for each of the above-described plurality of bands.

According to such determination of the transmission power which can be used, for example, it is possible to determine an additional band which can be used more flexibly. For example, when, concerning a certain frequency band, while interference becomes extremely large when large transmission power is used, interference becomes smaller when smaller transmission power is used, small transmission power can be determined as transmission power which can be used, and the above-described certain frequency band can be determined as an additional band.

Determination Based on Position

For example, the control unit 235 determines the above-described additional band based on the above-described communication related information and positions of the base station 300 and the wireless communication apparatus 100. Further, for example, the control unit 235 determines the transmission power which can be used for the above-described additional band based on the above-described communication related information and the positions of the base station 300 and the wireless communication apparatus 100.

By this means, for example, it is possible to estimate interference of wireless communication of the base station 300 to the above-described another wireless communication (for example, wireless LAN communication) of the wireless communication apparatus 100 and determine an additional band (and transmission power) so that the interference becomes smaller.

Method for Determining Additional Band

One Example of Specific Method

The control unit 235 estimates interference of wireless communication of the base station 300 to the above-described another wireless communication of the wireless communication apparatus 100 based on the above-described communication related information and the positions of the base station 300 and the wireless communication apparatus 100 and determines the above-described additional band (and transmission power which can be used for the additional band) based on the estimated interference. Further, for example, the control unit 235 also determines the transmission power which can be used for the above-described additional band.

More specifically, for example, the above-described shared band includes a plurality of bands, and the control unit 235 selects one band out of the plurality of bands. Further, the control unit 235 selects one transmission power candidate from a plurality of transmission power candidates of the base station 300.

The control unit 235 then estimates interference of the wireless communication of the base station 300 to the above-described another wireless communication of the wireless communication apparatus 100 in the case where the above-described one band is used at the above-described one transmission power candidate based on the above-described communication related information and the positions of the base station 300 and the wireless communication apparatus 100 for each of the wireless communication apparatuses 100. Further, the control unit 235 estimates interference of the wireless communication of the base station 300 to the above-described another wireless communication of the above-described another wireless communication apparatus in the case where the above-described one band is used at the above-described one transmission power candidate based on the above-described information regarding the above-described another wireless communication performed by the above-described another wireless communication apparatus using the above-described shared band and the positions of the base station 300 and the above-described another wireless communication apparatus for each of the another wireless communication apparatuses (for example, an access point of wireless LAN) which use the above-described shared band.

When interference to the above-described another wireless communication of any wireless communication apparatus 100 is sufficiently small, and interference to the above-described another wireless communication of any another wireless communication apparatus is sufficiently small, the control unit 235 adds the above-described one band to the additional band. As an example, an SINR is estimated for each of the wireless communication apparatuses 100 and each of the above-described another wireless communication apparatuses, and, when all the SINRs exceeds a threshold, the control unit 235 adds the above-described one band to the additional band.

Meanwhile, when interference to the above-described another wireless communication of any wireless communication apparatus 100 is large or interference to the above-described another wireless communication of any another wireless communication apparatus is large, the control unit 235 selects another transmission power candidate out of the above-described plurality of transmission power candidates, and estimates interference again as described above. If the above-described interference does not become sufficiently small for any of the transmission power candidates, the control unit 235 does not add the above-described one band to the additional band.

The control unit 235 performs the processing as described above for each of the above-described plurality of bands included in the above-described shared band. As a result, the above-described additional band includes (or does not include any band), for example, one or more bands out of the plurality of bands included in the above-described shared band, and the control unit 235 ultimately determines the above-described additional band.

Other Examples

While an example has been described where only interference of the wireless communication of the base station 300 to the above-described another wireless communication of the wireless communication apparatus 100 (and another wireless communication apparatus) is taken into account, the present disclosure is not limited to this example. For example, the above-described additional band may be determined while interference of the above-described another wireless communication (for example, wireless LAN communication) of the wireless communication apparatus 100 (and another wireless communication apparatus) to the wireless communication of the base station 300 is taken into account in place of the above-described interference or along with the above-described interference.

Further, while an example where interference is estimated has been described, the present disclosure is not limited to this example. For example, a band for which no interference is estimated and which is not used by the wireless communication apparatus 100 and the above-described another wireless communication apparatus may be determined as the above-described additional band.

Timing for Determination of Additional Band

For example, when the base station 300 requests an additional band, the control unit 235 determines the above-described additional band. Specifically, for example, when the control unit 235 receives an additional band request message from the base station 300, the control unit 235 determines the above-described additional band. By this means, for example, the base station 300 can use the additional band according to the needs of the base station 300.

It should be noted that the control unit 235 may determine the above-described additional band at other timings in place of a timing at which the base station 300 makes a request or along with the timing. For example, the control unit 235 may determine the above-described additional band according to occurrence of other events. The other events may be predetermined change (for example, the number of wireless communication apparatuses 100 becomes less than a predetermined number) of the wireless communication apparatus 100 located around the base station 300. Further, the other events may be predetermined change of the number of wireless communication apparatuses 400 connected to the base station 300 or predetermined change of a traffic amount processed by the base station 300. Alternatively, the control unit 235 may determine the above-described additional band with a predetermined period. The predetermined period may be a fixed period or a variable period.

As described above, the above-described additional band is determined. By this means, for example, it is possible to allow the above-described wireless communication system to more appropriately use a frequency band to be shared between wireless communication of the wireless communication system and another wireless communication. More specifically, for example, even when measurement/detection cannot be performed for the above-described another wireless communication (for example, wireless LAN communication) of the wireless communication apparatus 100, wireless communication by the wireless communication apparatus 100 is taken into account. Therefore, it is possible to use a shared band for wireless communication of the wireless communication system while suppressing interference between the wireless communication of the wireless communication system and another wireless communication of the wireless communication apparatus 100.

(b) Provision of Additional Band Information

For example, the control unit 235 provides information indicating the above-described additional band (hereinafter, referred to as "additional band information") to the base station 300. For example, the above-described additional band information further indicates the determined transmission power (that is, transmission power which can be used for the above-described additional band).

For example, the control unit 235 provides the above-described additional band information to the base station 300 after determining the above-described additional band. Further, the control unit 235 provides the above-described additional band information to the base station 300 via the communication unit 210. More specifically, for example, the control unit 235 provides the above-described additional band information to the base station 300 by transmitting the above-described additional band information to the base station 300 via the communication unit 210.

By this means, for example, the base station 300 can actually use the determined additional band.

(c) Others

It should be noted that the control unit 235 may further determine a band which can be used for wireless communication of the base station 300 among the above-described frequency band (for example, a cellular band) for the above-described wireless communication system in addition to the above-described additional band among the above-described shared band. The control unit 235 may then provide information indicating the band to the base station 300.

For example, one or more other base stations located around the base station 300 is specified (for example, by the apparatus specifying unit 231). Further, information regarding wireless communication performed by the above-described one or more other base stations using a frequency band (for example, a cellular band) for the wireless communication system (such as, for example, use band information, transmission power information and/or other communication parameters) is acquired (for example, by the information acquiring unit 233). For example, the information is information provided in advance by the above-described one or more other base stations. The control unit 235 then determines a frequency band which can be used by the base station 300 among the above-described frequency band for the wireless communication system (for example, a cellular band) based on the above-described information and positions of the base station 300 and the above-described one or more other base stations. More specifically, for example, the control unit 235 estimates interference of wireless communication of the above-described one or more other base stations to the wireless communication of the base station 300 for each of a plurality of bands included in the frequency band for the above-described wireless communication system. The control unit 235 then determines a band where interference is sufficiently small among the above-described plurality of bands as a band which can be used for wireless communication of the base station 300. The control unit 235 then provides information indicating the determined band to the base station 300.

By this means, for example, it is possible to suppress interference between base stations (for example, a macro base station and a small base station) of the wireless communication system.

Further, the control unit 235 may determine transmission power which can be used for the band along with a band which can be used for wireless communication of the base station 300. For example, the control unit 235 may determine a band where interference is sufficiently small among the above-described plurality of bands and transmission power as a band which can be used for wireless communication of the base station 300 and transmission power which can be used for the band. According to such determination of the transmission power which can be used, for example, it is possible to determine a band which can be used more flexibly.

It should be noted that it can be necessary to change (for example, lower transmission power) a communication parameter (such as, for example, transmission power and a band) of any of the above-described one or more other base stations to make interference of wireless communication of the above-described one or more other base stations to the wireless communication of the base station sufficiently small. Therefore, the control unit 235 may determine whether it is necessary to change a communication parameter of any of the above-described one or more other base stations. When the control unit 235 determines that it is necessary to change the above-described communication parameter, the control unit 235 may instruct the corresponding other base station to change the above-described communication parameter (for example, change transmission power). The control unit 235 may determine a communication parameter of the corresponding other base station and instruct the corresponding other base station to change the communication parameter to the determined communication parameter when instructing the corresponding other base station to change the communication parameter.

2.3. Configuration of Base Station

Figure 6:
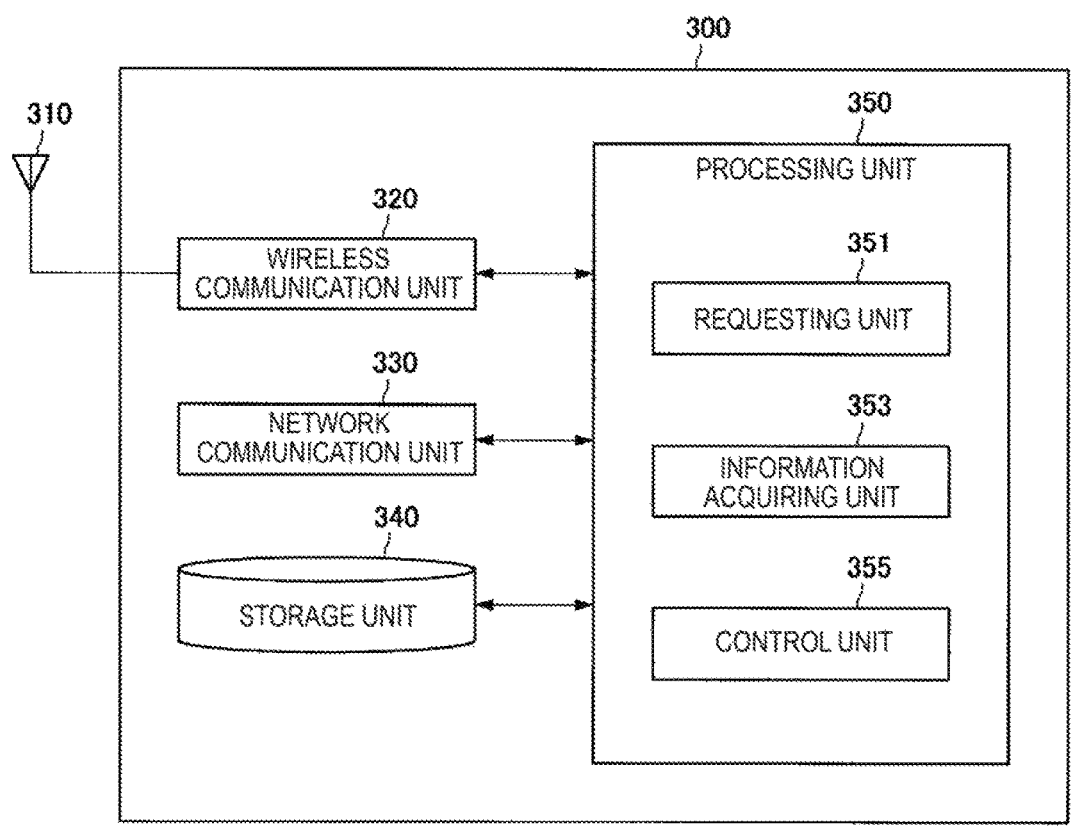
FIG. 6 is a block diagram illustrating an example of a configuration of a base station according to the embodiment.

An example of the configuration of the base station 300 according to the present embodiment will be described next with reference to FIG. 6 to FIG. 11. FIG. 6 is a block diagram illustrating an example of the configuration of the base station 300 according to the present embodiment. The base station 300 includes an antenna unit 310, a wireless communication unit 320, a network communication unit 330, a storage unit 340 and a processing unit 350.
(Antenna Unit 310)

The antenna unit 310 emits a signal into the space as a radio wave, the signal being output by the wireless communication unit 320. The antenna unit 310 also converts a radio wave in the space into a signal, and outputs the signal to the wireless communication unit 320.
(Wireless Communication Unit 320)

The wireless communication unit 320 transmits and receives a signal in wireless communication of the wireless communication system. For example, the wireless communication system is a cellular system, and the wireless communication unit 320 transmits and receives a signal in the cellular communication. Specifically, for example, the wireless communication unit 320 transmits a downlink signal to the wireless communication apparatus and receives an uplink signal from the wireless communication apparatus.
(Network Communication Unit 330)

The network communication unit 330 communicates with another node. For example, the network communication unit 330 communicates with the information processing apparatus 200. Further, for example, the network communication unit 330 may communicate with another base station and/or a core network node (for example, an S-GW, a P-GW, and/or MME).
(Storage Unit 340)

The storage unit 340 temporarily or persistently stores a program and data for operation of the base station 300.
(Processing Unit 350)

The processing unit 350 provides various functions of the base station 300. The processing unit 350 includes a requesting unit 351, an information acquiring unit 353 and a control unit 355. It should be noted that the processing unit 350 can further include components other than these components. That is, the processing unit 350 can perform operation other than the operation of these components.
(Requesting Unit 351)

The requesting unit 351 requests an additional band which can be used for the above-described wireless communication of the above-described wireless communication system to the information processing apparatus 200 in addition to the frequency band for the above-described wireless communication system among the above-described shared band.

As described above, the above-described wireless communication system is a cellular system. That is, the requesting unit 351 requests an additional band which can be used for the cellular communication in addition to a cellular band among the above-described shared band to the information processing apparatus 200.

For example, the requesting unit 351 requests the above-described additional band to the information processing apparatus 200 via the network communication unit 330. More specifically, for example, the requesting unit 351 requests the above-described additional band to the information processing apparatus 200 by transmitting an additional band request message to the information processing apparatus 200 via the network communication unit 330.

The requesting unit 351, for example, requests the above-described additional band according to a communication state of the base station 300. For example, the requesting unit 351 requests the above-described additional band according to traffic at the base station 300. As an example, the requesting unit 351 requests the above-described additional band when the above-described traffic exceeds a predetermined threshold.

It should be noted that the requesting unit 351 may provide position specifying information (such as, for example, GPS information) for specifying the position of the base station 300 to the information processing apparatus 200 when requesting the above-described additional band or separately from request of the above-described additional band.
(Information Acquiring Unit 353)

The information acquiring unit 353 acquires information indicating the above-described additional band (that is, additional band information).

As described above, for example, the information processing apparatus 200 determines the above-described additional band and provides additional band information indicating the additional band to the base station 300. The additional band information is then stored in the storage unit 340. At any timing after that, the information acquiring unit 353 acquires the above-described additional band information from the storage unit 340.

It should be noted that, for example, the above-described additional band information indicates transmission power which can be used for the above-described additional band.
(Control Unit 355)

The control unit 355 controls the base station 300 so that the base station 300 performs the above-described wireless communication of the above-described wireless communication system using the above-described additional band.

As described above, the above-described wireless communication system is a cellular system. That is, the control unit 355 controls the base station 300 so that the base station 300 performs cellular communication using the above-described additional band.

Example of Control

For example, the control unit 355 performs setting for use of the above-described additional band. Specifically, for example, the control unit 355 sets the additional band indicated in the above-described additional band information as a carrier (for example, a component carrier (CC)) used by the base station 300. Further, for example, the control unit 355 sets transmission power indicated in the above-described additional band information as transmission power (for example, maximum transmission power) which can be used by the base station 300 for the above-described additional band. Further, for example, the control unit 355 also sets other communication parameters for use of the above-described additional band.

Further, for example, the control unit 355 schedules radio resources of the above-described additional band.

Further, for example, the control unit 355 transmits data and control information via the wireless communication unit 320. More specifically, the control unit 355 maps signals of the data and the control information to the radio resources according to the schedule. Further, the control unit 355 generates a transmission signal (for example an OFDMA signal) to be transmitted by the wireless communication unit 320 from the signals mapped to the radio resources.

It should be noted that the above-described additional band is not used as a primary component carrier (PCC) for the wireless communication apparatus, but is used as a secondary component carrier (PCC) for the wireless communication apparatus. By this means, for example, when the above-described additional band cannot be used, it becomes unnecessary to take a lot of trouble with handover from the above-described additional band.

Control of Transmission Power

The control unit 355 controls the base station 300 to perform the above-described wireless communication (for example, cellular communication) of the above-described wireless communication system using the above-described additional band at transmission power according to the transmission power of the base station 300 regarding the above-described frequency band (for example, a cellular band) for the above-described wireless communication system.

For example, the control unit 355 controls the base station 300 so as to perform the above-described wireless communication (for example, cellular communication) of the above-described wireless communication system using the above-described additional band so that a difference between transmission power for the above-described frequency band (for example, a cellular band) for the above-described wireless communication system and transmission power for the above-described additional band becomes less than a predetermined threshold. It should be noted that the above-described transmission power is, for example, transmission power, or the like, per resource block.

A specific example of relationship between transmission power of the cellular band and transmission power of the additional band will be described below with reference to FIG. 7 to FIG. 11. FIG. 7 to FIG. 11 are explanatory diagrams for explaining first to fifth examples of the relationship between the transmission power of the cellular band and the transmission power of the additional band.

In the example of FIG. 7, the base station 300 uses a partial band among the cellular band 50 at transmission power $P_1$. Further, transmission power $P_2$ which can be used for the additional band 63 among the shared band 60 is smaller than the transmission power $P_1$, and a difference $P_{DIFF}$ between the transmission power $P_1$ and the transmission power $P_2$ is equal to or larger than a predetermined threshold T. Therefore, the base station 300 does not use the additional band 63.

In the example of FIG. 8, the base station 300 uses a partial band among the cellular band 50 at the transmission power $P_1$. Further, the transmission power $P_2$ which can be used for the additional band 63 among the shared band 60 is smaller than the transmission power $P_1$, and the difference $P_{DIFF}$ between the transmission power $P_1$ and the transmission power $P_2$ is less than the predetermined threshold T. Therefore, the base station 300, for example, uses the additional band 63 at the transmission power $P_2$.

In the example of FIG. 9, the base station 300 uses a partial band among the cellular band 50 at the transmission power $P_1$. Further, the transmission power $P_2$ which can be used for the additional band 63 among the shared band 60 is larger than the transmission power $P_1$. Therefore, the base station 300, for example, uses the additional band 63 at the transmission power $P_1$.

Figure 10:
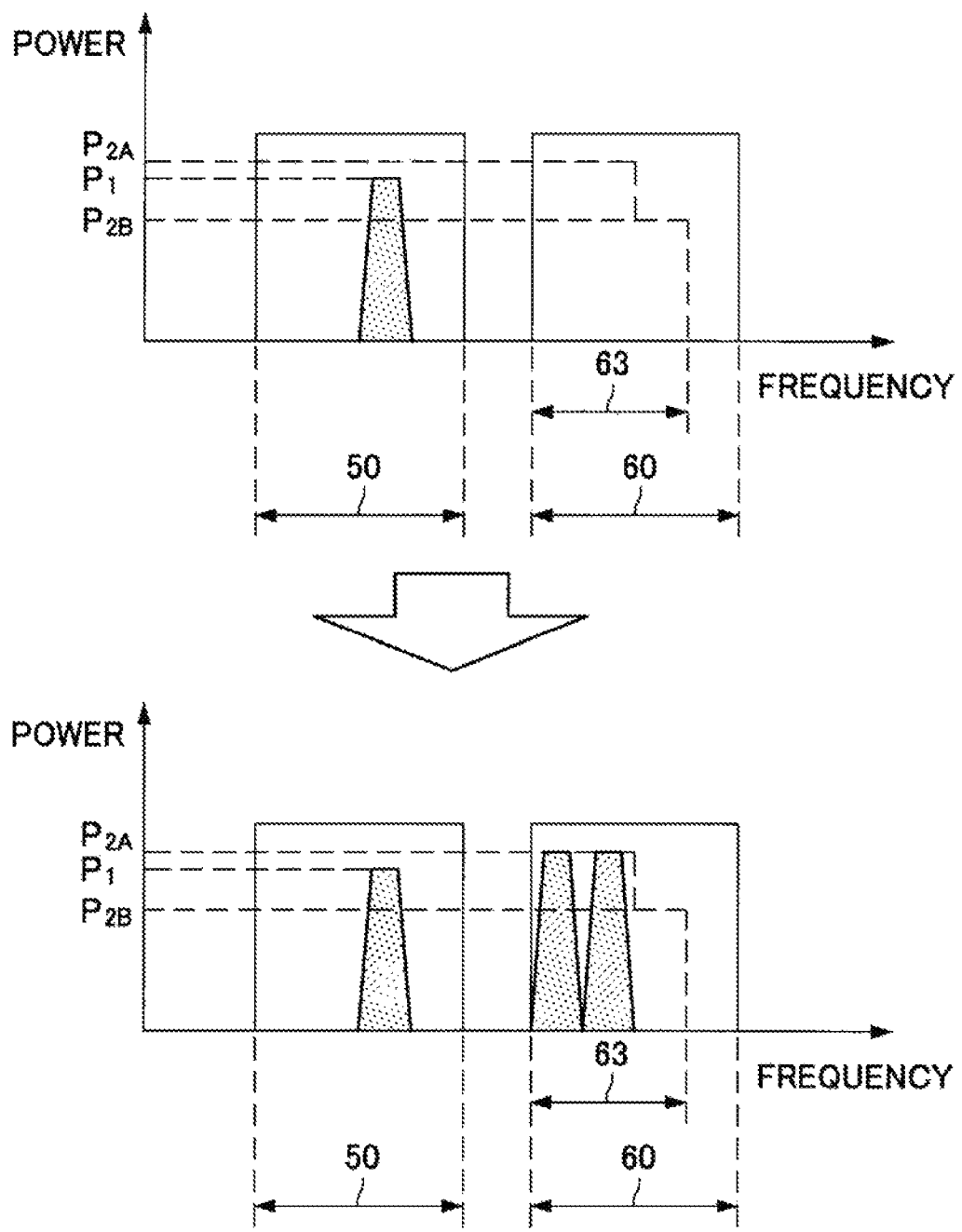
FIG. 10 is an explanatory diagram for explaining a fourth example of relationship between transmission power of a cellular band and transmission power of an additional band.

In the example of FIG. 10, the base station 300 uses a partial band among the cellular band 50 at the transmission power $P_1$. Transmission power $P_{2A}$ which can be used for a first band among the additional band 63 is smaller than the transmission power $P_1$, and a difference between the transmission power $P_1$ and the transmission power $P_{2A}$ is less than the predetermined threshold T. On the other hand, transmission power $P_{2B}$ which can be used for a second band among the additional band 63 is smaller than the transmission power $P_1$, and a difference between the transmission power $P_1$ and the transmission power $P_{2B}$ is equal to or larger than the predetermined threshold T. Therefore, the base station 300, for example, uses the above-described first band among the additional band 63 at the transmission power $P_{2A}$ and does not use the above-described second band among the additional band 63.

In the example of FIG. 11, the base station 300 uses a partial band among the cellular band 50 at the transmission power $P_1$. The transmission power $P_{2A}$ which can be used for the first band among the additional band 63 is larger than the transmission power $P_1$. Further, the transmission power $P_{2B}$ which can be used for the second band among the additional band 63 is also larger than the transmission power $P_1$. Therefore, the base station 300, for example, uses the additional band 63 at the transmission power $P_1$.

According to use of the additional band at such transmission power, for example, when a signal of the frequency band (for example, a cellular band) for the wireless communication system and a signal of the above-described additional band are processed at a common reception circuit in the wireless communication apparatus, it is possible to prevent one signal from suppressing the other signal due to non-linearity of the reception circuit.

2.4. Configuration of Wireless Communication Apparatus

Figure 12:
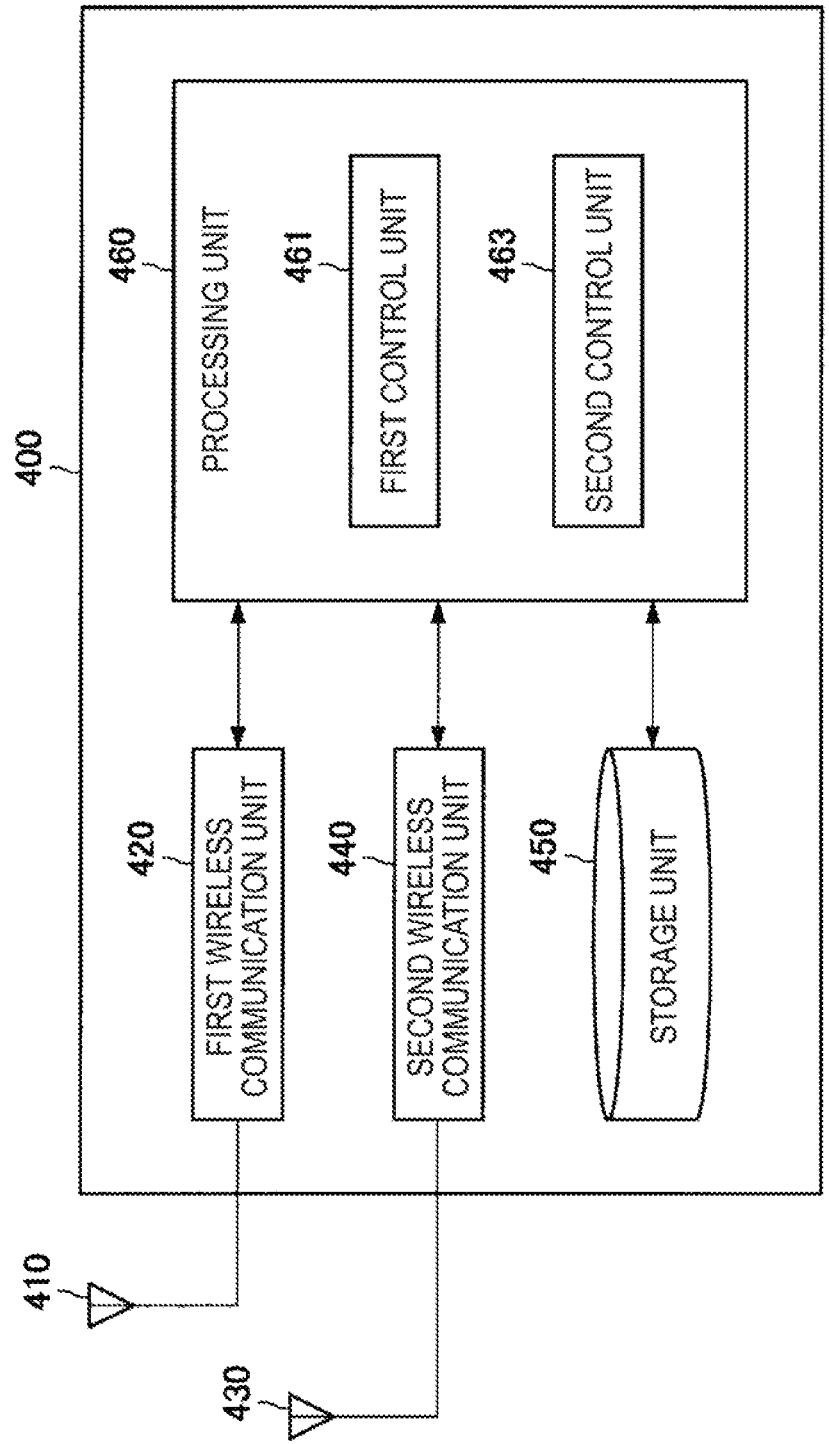
FIG. 12 is a block diagram illustrating an example of a configuration of a wireless communication apparatus according to the embodiment.

An example of the configuration of the wireless communication apparatus 400 according to the present embodiment will be described next with reference to FIG. 12. FIG. 12 is a block diagram illustrating an example of the configuration of the wireless communication apparatus 400 according to the present embodiment. The wireless communication apparatus 400 includes an antenna unit 410, a first wireless communication unit 420, an antenna unit 430, a second wireless communication unit 440, a storage unit 450 and a processing unit 460.

(Antenna Unit 410)

The antenna unit 410 emits a signal into the space as a radio wave, the signal being output by the first wireless communication unit 420. The antenna unit 410 also converts a radio wave in the space into a signal, and outputs the signal to the first wireless communication unit 420.

(First Wireless Communication Unit 420)

The first wireless communication unit 420 transmits and receives a signal in wireless communication of the wireless communication system. For example, the wireless communication system is a cellular system, and the first wireless communication unit 420 transmits and receives a signal in the cellular communication. Specifically, for example, the first wireless communication unit 420 receives a downlink signal from the base station 300 and transmits an uplink signal to the base station 300.

(Antenna Unit 430)

The antenna unit 430 emits a signal into the space as a radio wave, the signal being output by the second wireless communication unit 440. The antenna unit 430 also converts a radio wave in the space into a signal, and outputs the signal to the second wireless communication unit 440.

(Second Wireless Communication Unit 440)

The second wireless communication unit 440 transmits and receives a signal in another wireless communication different from the wireless communication of the wireless communication system. For example, the above-described another wireless communication is wireless communication according to wireless LAN standards, and the second wireless communication unit 440 transmits and receives a signal in wireless LAN communication.

(Storage Unit 450)

The storage unit 450 temporarily or persistently stores a program and data for the operation of the wireless communication apparatus 400.

(Processing Unit 460)

The processing unit 460 provides various functions of the wireless communication apparatus 400. The processing unit 460 includes a first control unit 461 and a second control unit 463. It should be noted that the processing unit 460 can further include components other than these components. That is, the processing unit 460 can perform operation other than the operation of these components.

(First Control Unit 461)

The first control unit 461 controls the wireless communication apparatus 400 so that the wireless communication apparatus 400 performs the above-described wireless communication (for example, the cellular communication) of the above-described wireless communication system using the above-described additional band among the above-described shared band and the frequency band (for example, a cellular band) for the above-described wireless communication system.

For example, the base station 300 instructs the wireless communication apparatus 400 to add the above-described additional band as an SCC of the wireless communication apparatus 400. Specifically, for example, the base station 300 instructs the wireless communication apparatus 400 to add the above-described additional band as the SCC of the wireless communication apparatus 400 using an RRC reconfiguration message or a MAC control element. The first control unit 461 then makes the wireless communication apparatus 400 start use of the above-described additional band as the SCC.

(Second Control Unit 463)

The second control unit 463 controls the wireless communication apparatus 400 so that the wireless communication apparatus 400 does not perform the above-described another wireless communication (for example, wireless LAN communication) using the above-described additional band while the wireless communication apparatus 400 performs the above-described wireless communication (for example, cellular communication) of the above-described wireless communication system using the above-described additional band.

For example, while the base station 300 uses the above-described additional band for the cellular communication, the second control unit 463 does not select the above-described additional band as a channel newly used for wireless LAN communication. Further, for example, when the base station 300 starts using the above-described additional band for cellular communication, the second control unit 463 stops use of the above-described additional band for wireless LAN communication.

By this means, for example, it is possible to avoid another wireless communication (for example, wireless LAN communication) by the wireless communication apparatus 400 from interfering with wireless communication (for example, cellular communication) of the wireless communication system by the wireless communication apparatus 400.

It should be noted that while the base station 300 uses the above-described additional band for cellular communication, the wireless communication apparatus 400 may not perform wireless LAN communication using the shared band. Further, if cellular communication is not performed using the additional band, the base station 300 may perform wireless LAN communication using an arbitrary band among the shared band.

An example of the configuration of the wireless communication apparatus 400 has been described above. It should be noted that the wireless communication apparatus (the processing unit 460) may further include the components of the wireless communication apparatus 100 (for example, the information acquiring unit 161 and the information providing unit 163).

3. Processing Flow

Subsequently, an example of processing according to an embodiment of the present disclosure will be described with reference to FIG. 13 to FIG. 15.

(Information Providing Processing)

Figure 13:
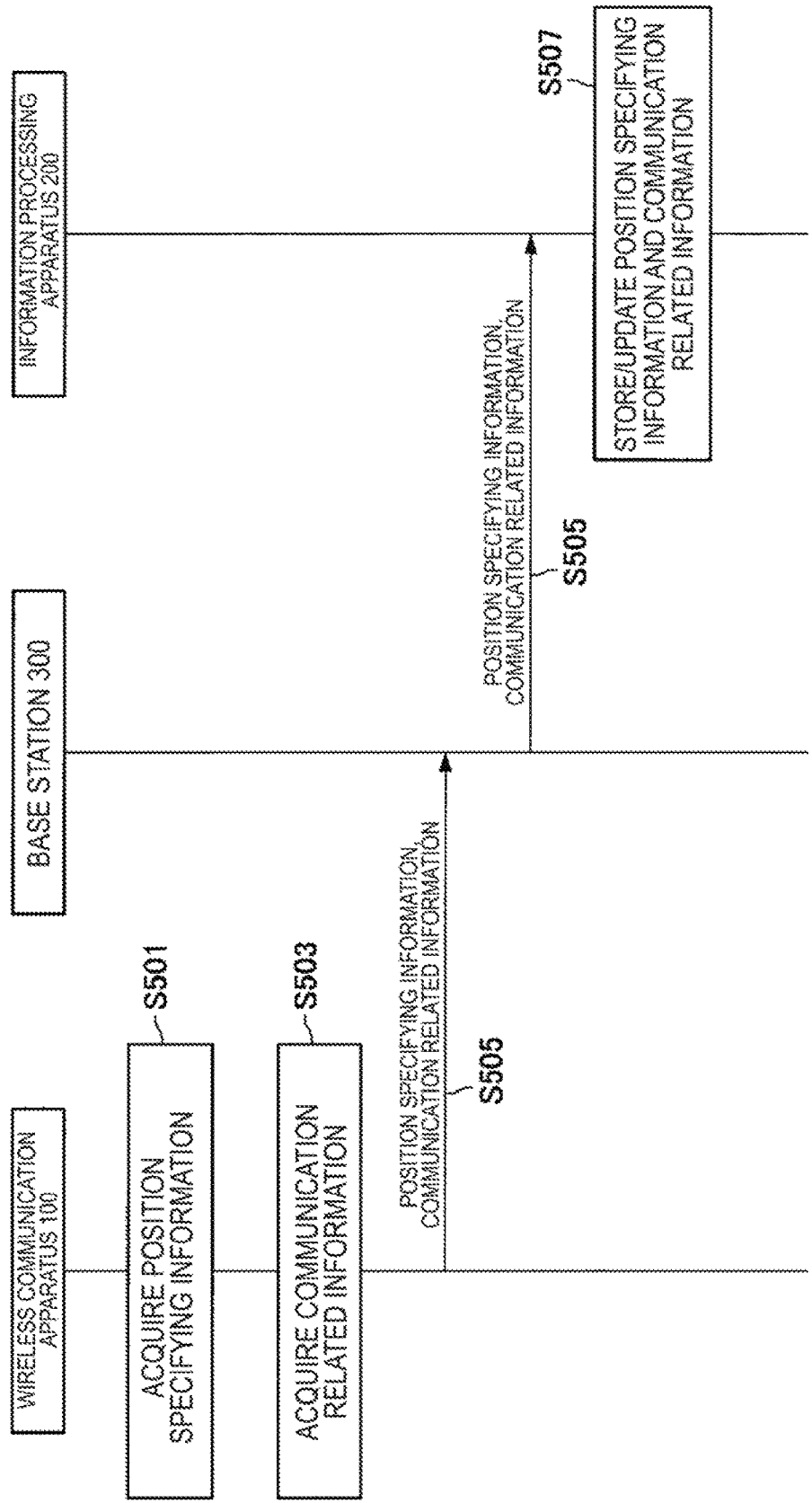
FIG. 13 is a sequence diagram illustrating an example of schematic flow of information provision processing according to the embodiment.

FIG. 13 is a sequence diagram illustrating an example of schematic flow of information providing processing according to the present embodiment.

The wireless communication apparatus 100 acquires position specifying information for specifying the position of the wireless communication apparatus 100 (S501). Further, the wireless communication apparatus 100 acquires information (that is, communication related information) regarding the above-described another wireless communication performed by the wireless communication apparatus 100 using a shared band to be shared between the wireless communication (for example, cellular communication) of the wireless communication system and another wireless communication (for example, wireless LAN communication) (S503). The wireless communication apparatus 100 then provides the above-described position specifying information and the above-described communication related information to the information processing apparatus via the base station 300 (S505).

The information processing apparatus 200 stores or updates the above-described position specifying information and the above-described communication related information (S507).

(Band Addition Processing)

Figure 14:
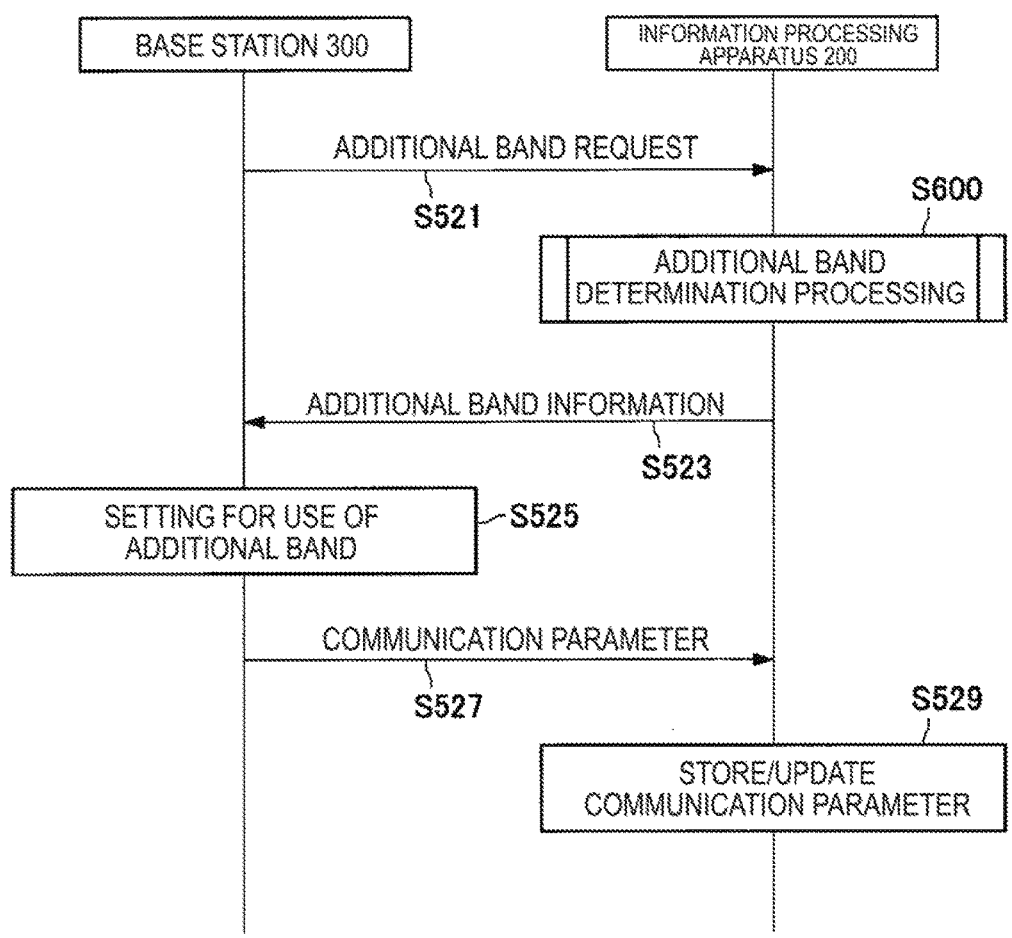
FIG. 14 is a sequence diagram illustrating an example of schematic flow of information provision processing according to the embodiment.

FIG. 14 is a sequence diagram illustrating an example of schematic flow of band addition processing according to the present embodiment.

The base station 300 requests an additional band which can be used for wireless communication (for example, cellular communication) of the above-described wireless communication system in addition to the frequency band (for example, a cellular band) for the wireless communication system to the information processing apparatus 200 (S521). Specifically, for example, the base station 300 transmits an additional band request message to the information processing apparatus 200.

The information processing apparatus 200 then performs additional band determination processing (S600). By this means, the information processing apparatus 200 determines the above-described additional band. The information processing apparatus 300 then provides additional band information indicating the determined additional band to the base station 300 (S523).

The base station 300 then performs setting for use of the above-described additional band (S525). For example, the base station 300 sets the additional band indicated in the above-described additional band information as a carrier (for example, a CC) used by the base station 300. Further, for example, the base station 300 sets transmission power indicated in the above-described additional band information as transmission power (for example, maximum transmission power) which can be used by the base station 300 for the above-described additional band. Further, for example, the control unit 355 also sets other communication parameters for use of the above-described additional band.

Then, the base station 300 provides a communication parameter for the base station 300 to the information processing apparatus 200 (S527). For example, the communication parameter includes an additional band, transmission power and/or other parameters.

The information processing apparatus 200 then stores or updates the above-described communication parameter for the base station 300 (S529).

(Additional Band Determination Processing)

FIG. 15 is a flowchart illustrating an example of schematic flow of additional band determination processing according to the present embodiment.

The apparatus specifying unit 231 specifies the wireless communication apparatus 100 located around the base station 300 based on the position of the wireless communication apparatus 100 (S601).

Next, the information acquiring unit 233 acquires communication related information regarding the specified wireless communication apparatus 100 (that is, the wireless communication apparatus 100 located around the base station 300) (S603).

The control unit 235 then estimates interference of wireless communication of the base station 300 to another wireless communication (for example, wireless LAN communication) of the wireless communication apparatus 100 based on the above-described communication related information and positions of the base station 300 and the wireless communication apparatus 100 (S605).

Further, the control unit 235 determines the above-described additional band (and transmission power which can be used for the additional band) among the shared band based on the estimated interference. Then, the processing ends.

4. Application Examples

The technology according to the present disclosure is applicable to a variety of products. The information processing apparatus 200 may be implemented as any type of server such as tower servers, rack servers, and blade servers. At least a part of components of the information processing apparatus 200 may be implemented as a module (e.g. integrated circuit module that includes a single die, or card or blade that is inserted into a slot of a blade server) mounted on a server.

The base station 300 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 300 may be implemented as another type of base station such as Nodes B or base transceiver stations (BTSs). The base station 300 may include the main apparatus (which is also referred to as base station apparatus) that controls wireless communication and one or more remote radio heads (RRHs) that are disposed at different locations from that of the main apparatus. Further, various types of terminals as will be discussed later may temporarily or semi-persistently execute the base station function to operate as the base station 300.

The wireless communication apparatus (that is, each of the wireless communication apparatus 100 and the wireless communication apparatus 400) may be implemented as a mobile terminal such as smartphones, tablet personal computers (PCs), notebook PCs, portable game terminals, portable/dongle mobile routers, and digital cameras, or an in-vehicle terminal such as car navigation apparatuses. The wireless communication apparatus may also be implemented as a terminal (which is also referred to as machine type communication (MTC) terminal) that performs machine to machine (M2M) communication. Furthermore, at least part of components of the wireless communication apparatus may be implemented as a module (e.g. integrated circuit module constituted with a single die) that is mounted on these terminals.

4.1. Application Examples for Control Entity

FIG. 16 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program executed by the processor 701 and data. The storage 703 can include a storage medium such as semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

In the server 700 illustrated in FIG. 16, the information acquiring unit 233 and the control unit 235 (and the apparatus specifying unit 231) described with reference to FIG. 5 may be implemented at the processor 701. As an example, a program for making the processor function as the information acquiring unit 233 and the control unit 235 (and the apparatus specifying unit 231) (in other words, a program for making the processor execute operation of the information acquiring unit 233 and the control unit 235 (and the apparatus specifying unit 231)) may be installed in the server 700, and the processor 701 may execute the program. As another example, a module including the processor 701 and the memory 702 may be mounted on the server 700, and the information acquiring unit 233 and the control unit 235 (and the apparatus specifying unit 231) may be implemented at the module. In this case, the above-described module may store a program for making the processor function as the information acquiring unit 233 and the control unit 235 (and the apparatus specifying unit 231) in the memory 702, and the processor 701 may execute the program. As described above, the server 700 or the above-described module may be provided as an apparatus including the information acquiring unit 233 and the control unit 235 (and the apparatus specifying unit 231), and the above-described program for making the processor function as the information acquiring unit 233 and the control unit 235 (and the apparatus specifying unit 231) may be provided. Further, a readable storage medium having the above-described program stored therein may be provided.

4.2. Application Examples for Base Station

First Application Example

Figure 17:
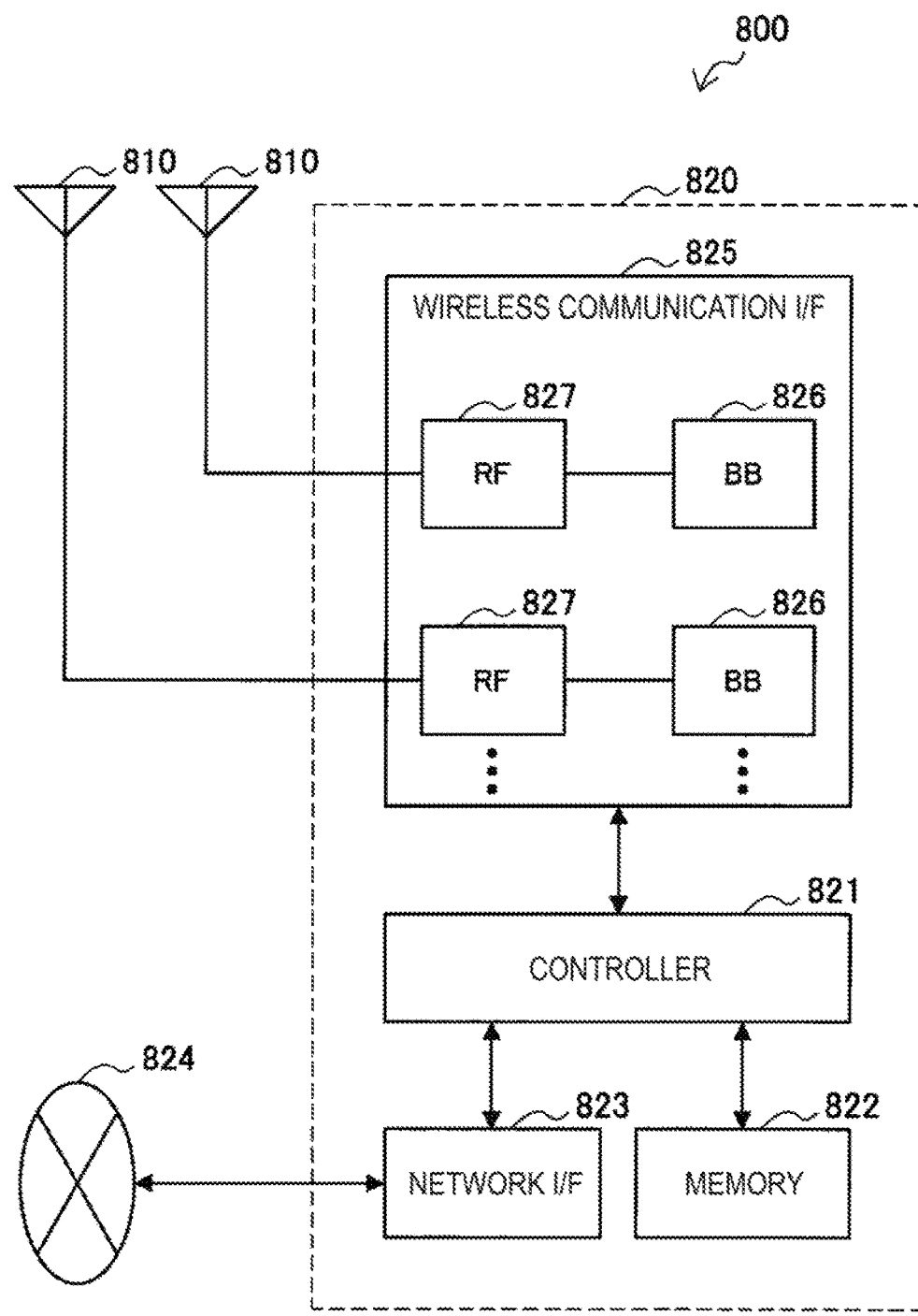
FIG. 17 is a block diagram illustrating a first example of a schematic configuration of an eNB.

FIG. 17 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 17, and the plurality of antennas 810 may, for example, correspond to a plurality of frequency bands used by the eNB 800. It should be noted that while FIG. 17 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 17, and the plurality of BB processors 826 may, for example, correspond to a plurality of frequency bands used by the eNB 800. The wireless communication interface 825 may also include a plurality of the RF circuits 827, as illustrated in FIG. 17, and the plurality of RF circuits 827 may, for example, correspond to a plurality of antenna elements. FIG. 17 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 17, the information acquiring unit 353 and the control unit 355 (and the requesting unit 351) described with reference to FIG. 6 may be implemented at the wireless communication interface 825. Alternatively, at least part of these components may be implemented at the controller 821. As an example, a module including part (for example, the BB processor 826) or all of the wireless communication interface 825 and/or the controller 821 may be mounted on the eNB 800, and the information acquiring unit 353 and the control unit 355 (and the requesting unit 351) may be implemented at the module. In this case, the above-described module may store a program for making the processor function as the information acquiring unit 353 and the control unit 355 (and the requesting unit 351) (in other words, a program for making the processor execute operation of the information acquiring unit 353 and the control unit 355 (and the requesting unit 351)) and execute the program. As another example, a program for making the processor function as the information acquiring unit 353 and the control unit 355 (and the requesting unit 351) may be installed in the eNB 800, and the wireless communication interface 825 (for example, the BB processor 826) and/or the controller 821 may execute the program. As described above, the eNB 800, the base station apparatus 820 or the above-described module may be provided as an apparatus including the information acquiring unit 353 and the control unit 355 (and the requesting unit 351), and a program for making the processor function as the information acquiring unit 353 and the control unit 355 (and the requesting unit 351) may be provided. Further, a readable storage medium having the above-described program stored therein may be provided.

It should be noted that, in the eNB 800 illustrated in FIG. 17, the wireless communication unit 320 described with reference to FIG. 6 may be implemented at the RF circuit 827 among the wireless communication interface 825. Further, in the eNB 800 illustrated in FIG. 17, the antenna unit 310 described with reference to FIG. 6 may be implemented at the antenna 810. Further, in the eNB 800 illustrated in FIG. 17, the network communication unit 330 described with reference to FIG. 6 may be implemented at the controller 821 and/or the network interface 823.

Second Application Example

Figure 18:
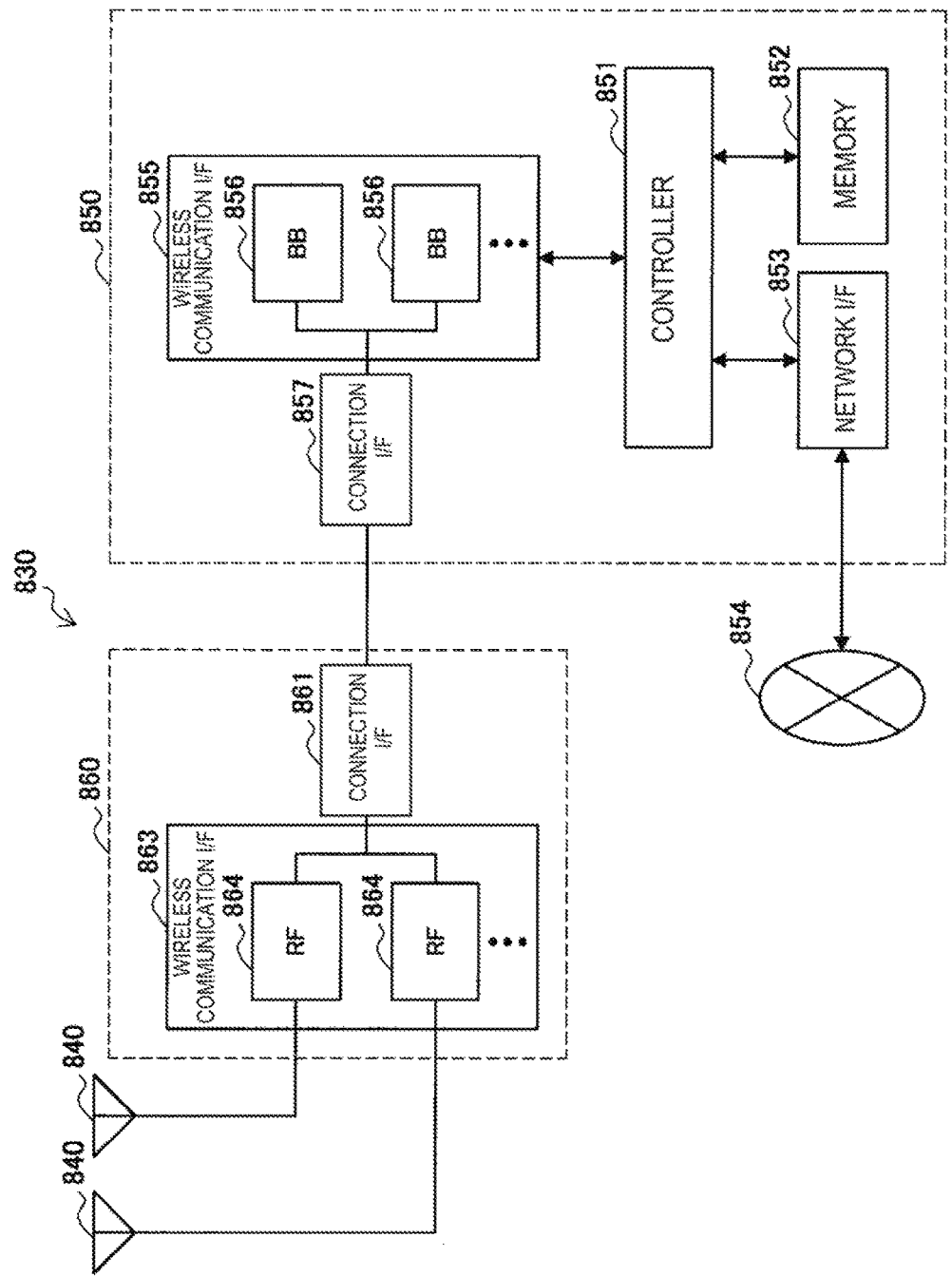
FIG. 18 is a block diagram illustrating a second example of the schematic configuration of the eNB.

FIG. 18 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 18, and the plurality of antennas 840 may, for example, correspond to a plurality of frequency bands used by the eNB 830. FIG. 18 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 17.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 17 except that the BB processor 856 is connected to an RF circuit 864 of the RRH 860 via the connection interface 857. The wireless communication interface 855 may include a plurality of the BB processors 856, as illustrated in FIG. 18, and the plurality of BB processors 856 may, for example, correspond to a plurality of frequency bands used by the eNB 830 respectively. FIG. 18 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 18, and the plurality of RF circuits 864 may, for example, correspond to a plurality of antenna elements. FIG. 18 illustrates an example in which the wireless communication interface 863 includes the plurality of RF circuits 864, but the wireless communication interface 863 may include the single RF circuit 864.

In the eNB 830 illustrated in FIG. 18, the information acquiring unit 353 and the control unit 355 (and the requesting unit 351) described with reference to FIG. 6 may be implemented at the wireless communication interface 855 and/or the wireless communication interface 863. Alternatively, at least part of these components may be implemented at the controller 851. As an example, a module including part (for example, the BB processor 856) or all of the wireless communication interface 855 and/or the controller 851 may be mounted on the eNB 830, and the information acquiring unit 353 and the control unit 355 (and the requesting unit 351) may be implemented at the module. In this case, the above-described module may store a program for making the processor function as the information acquiring unit 353 and the control unit 355 (and the requesting unit 351) (in other words, a program for making the processor execute operation of the information acquiring unit 353 and the control unit 355 (and the requesting unit 351)) and execute the program. As another example, a program for making the processor function as the information acquiring unit 353 and the control unit 355 (and the requesting unit 351) may be installed in the eNB 830, and the wireless communication interface 855 (for example, the BB processor 856) and/or the controller 851 may execute the program. As described above, the eNB 830, the base station apparatus 850 or the above-described module may be provided as an apparatus including the information acquiring unit 353 and the control unit 355 (and the requesting unit 351), and a program for making the processor function as the information acquiring unit 353 and the control unit 355 (and the requesting unit 351) may be provided. Further, a readable storage medium having the above-described program stored therein may be provided.

It should be noted that, in the eNB 830 illustrated in FIG. 18, the wireless communication unit 320 described with reference to FIG. 6 may be implemented at the wireless communication interface 863 (or the RF circuit 864). Further, in the eNB 830 illustrated in FIG. 18, the antenna unit 310 described with reference to FIG. 6 may be implemented at the antenna 840. Further, in the eNB 830 illustrated in FIG. 18, the network communication unit 330 described with reference to FIG. 6 may be implemented at the controller 851 and/or the network interface 853.

4.3. Application Examples for Wireless Communication Apparatus

First Application Example

Figure 19:
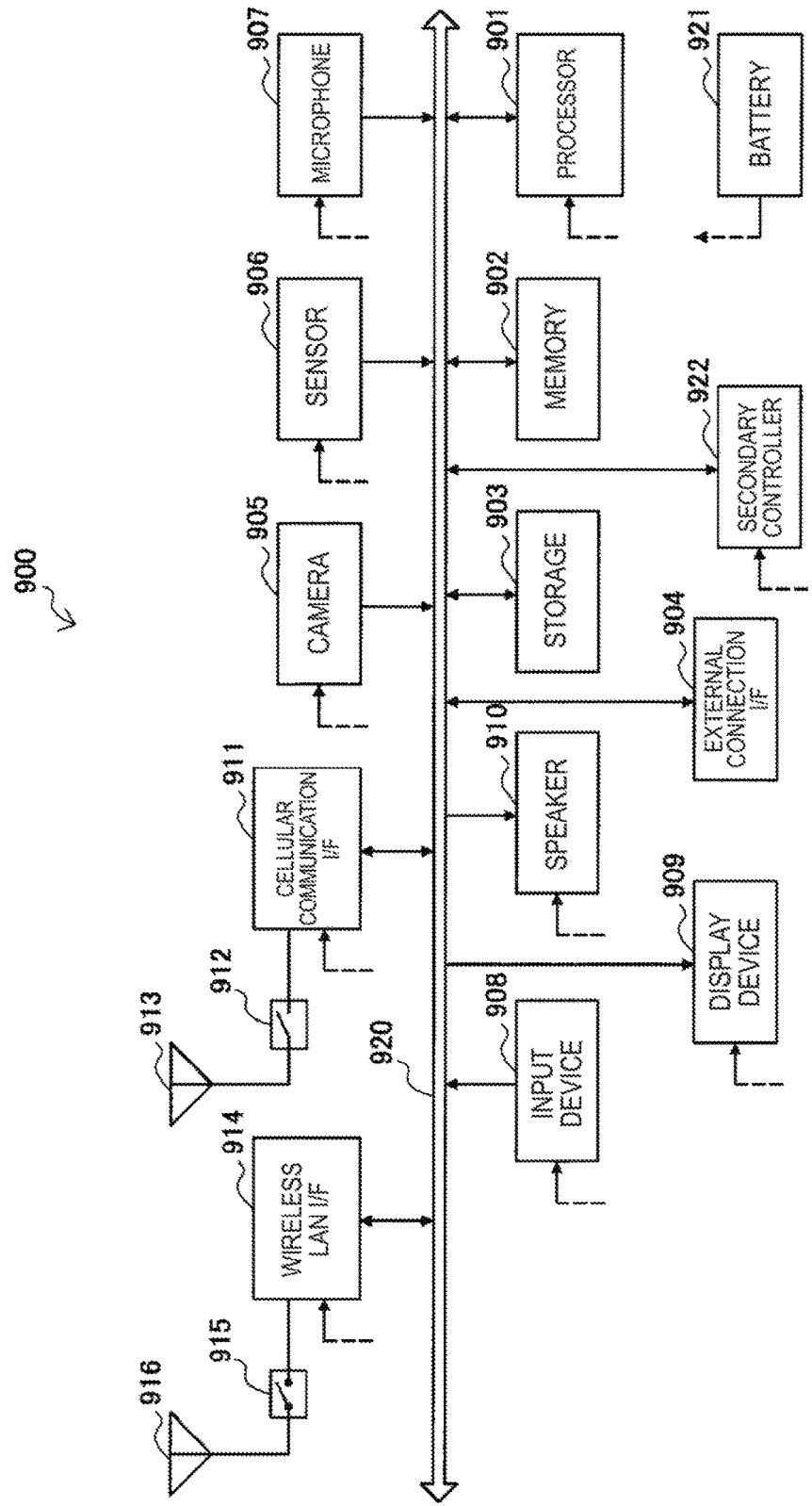
FIG. 19 is a block diagram illustrating an example of a schematic configuration of a smartphone.

FIG. 19 is a block diagram illustrating an example of a schematic configuration of a smartphone 900 to which the technology according to the present disclosure may be applied. The smartphone 900 includes a processor 901, a memory 902, a storage 903, an external connection interface 904, a camera 905, a sensor 906, a microphone 907, an input device 908, a display device 909, a speaker 910, a cellular communication interface 911, an antenna switch 912, an antennas 913, a wireless communication interface 914, an antenna switch 915, an antenna 916, a bus 920, a battery 921, and a secondary controller 922.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 905 includes an image sensor such as charge coupled devices (CCDs) and complementary metal oxide semiconductor (CMOS), and generates a captured image. The sensor 906 may include a sensor group including, for example, a positioning sensor, a gyro sensor, a geomagnetic sensor, and an acceleration sensor. The microphone 907 converts a sound that is input into the smartphone 900 to an audio signal. The input device 908 includes, for example, a touch sensor which detects that a screen of the display device 909 is touched, a key pad, a keyboard, a button, or a switch, and accepts an operation or an information input from a user. The display device 909 includes a screen such as liquid crystal displays (LCDs) and organic light emitting diode (OLED) displays, and displays an output image of the smartphone 900. The speaker 910 converts the audio signal that is output from the smartphone 900 to a sound.

The cellular communication interface 911 supports a cellular communication system such as LTE and LTE-Advanced, and executes wireless communication. The cellular communication interface 911 may typically include a baseband (BB) processor and a radio frequency (RF) circuit. The BB processor may, for example, perform encoding/decoding, modulation/demodulation, multiplexing/demultiplexing, and the like, and executes a variety of signal processing for wireless communication. Meanwhile, the RF circuit may include a mixer, a filter, and an amplifier, and transmits and receives a wireless signal via the antenna 913. The cellular communication interface 911 may be a one-chip module in which the BB processor and the RF circuit are integrated. The cellular communication interface 911 may include a single BB processor or a plurality of BB processors. Further, the cellular communication interface 911 may include a single RF circuit or a plurality of RF circuits. The antenna switch 912 switches a connection destination of the antenna 913 among the plurality of circuits included in the cellular communication interface 911. The antenna 913 has a single or a plurality of antenna elements (for example, a plurality of antenna elements constituting a multiple-input and multiple-output (MIMO) antenna) and is used for transmission and reception of a wireless signal through the cellular communication interface 911.

The wireless LAN communication interface 914 supports one or more of wireless LAN standards such as IEEE802.11a, 11b, 11g, 11n 11ac and 11ad and executes wireless communication. The wireless LAN communication interface 914 can communicate with other apparatuses via a wireless LAN access point in an infrastructure mode. Further, the wireless LAN communication interface 914 can directly communicate with other apparatuses in an ad hoc mode. The wireless LAN communication interface 914 can typically include a BB processor, an RF circuit, or the like. The wireless LAN communication interface 914 may be a one-chip module in which a memory having a communication control program stored therein, a processor executing the program and related circuits are integrated. The antenna switch 915 switches a connection destination of the antenna 916 among a plurality of circuits included in the wireless LAN communication interface 914. The antenna 916 has a single or a plurality of antenna elements (for example, a plurality of antenna elements constituting a MIMO antenna) and is used for transmission and reception of a wireless signal through the wireless LAN communication interface 914.

As illustrated in FIG. 19, the smartphone 900 may have antennas respectively corresponding to the cellular communication interface 911 and the wireless LAN communication interface 914. It should be noted that the smartphone 900 is not limited to the example of FIG. 19, and the smartphone 900 may have a shared antenna corresponding to the cellular communication interface 911 and the wireless LAN communication interface 914. As an example, the smartphone 900 may have a shared antenna and antenna switch corresponding to the cellular communication interface 911 and the wireless LAN communication interface 914 instead of including the antenna switch 912 and the antenna 913, and the antenna switch 915 and the antenna 916. The shared antenna may be connected to one of the cellular communication interface 911 and the wireless LAN communication interface 914 through the antenna switch.

Further, as illustrated in FIG. 19, the smartphone 900 may have the cellular communication interface 911 and the wireless LAN communication interface 914 as separate modules. It should be noted that the smartphone 900 is not limited to the example of FIG. 19, and the smartphone 900 may have a one-chip module including the cellular communication interface 911 and the wireless LAN communication interface 914. In this case, the smartphone 900 may include an antenna and an antenna switch shared between the communication interfaces or may include antennas respectively corresponding to the communication interfaces.

It should be noted that the antenna switch 912 and the antenna switch 915 may be omitted from the configuration of the smartphone 900.

The bus 920 connects the processor 901, the memory 902, the storage 903, the external connection interface 904, the camera 905, the sensor 906, the microphone 907, the input device 908, the display device 909, the speaker 910, the cellular communication interface 911, the wireless LAN communication interface 914, and the secondary controller 922 to each other. The battery 921 supplies electric power to each block of the smartphone 900 illustrated in FIG. 19 via a feeder line that is partially illustrated in the figure as a dashed line. The secondary controller 922, for example, operates a minimally necessary function of the smartphone 900 in a sleep mode.

In the smartphone 900 illustrated in FIG. 19, the information acquiring unit 161 and the information providing unit 163 described with reference to FIG. 4 may be implemented at the processor 901. Alternatively, at least part of these components may be implemented at the secondary controller 922, the cellular communication interface 911 and/or the wireless LAN communication interface 914. As an example, a program (such as, for example, a device driver and an operating system (OS)) for making the processor function as the information acquiring unit 161 and the information providing unit 163 may be installed in the smartphone 900, and the processor 901, the secondary controller 922, the cellular communication interface 911 and/or the wireless LAN communication interface 914 may execute the program. As another example, a module including the processor 901, the secondary controller 922, part or all of the cellular communication interface 911 and/or part or all of the wireless LAN communication interface 914 may be mounted on the smartphone 900, and the information acquiring unit 161 and the information providing unit 163 may be implemented at the module. In this case, the above-described module may store a program for making the processor function as the information acquiring unit 161 and the information providing unit 163 (in other words, a program for making the processor execute operation of the information acquiring unit 161 and the information providing unit 163) and execute the program. As described above, the smartphone 900 or the above-described module may be provided as an apparatus including the information acquiring unit 161 and the information providing unit 163, and a program for making the processor function as the information acquiring unit 161 and the information providing unit 163 may be provided. Further, a readable storage medium having the above-described program stored therein may be provided.

It should be noted that in the smartphone 900 illustrated in FIG. 19, the first wireless communication unit 120 described with reference to FIG. 4 may be implemented at the cellular communication interface 911. Further, the antenna unit 110 may be implemented at the antenna 913. Further, in the smartphone 900 illustrated in FIG. 19, the second wireless communication unit 140 described with reference to FIG. 4 may be implemented at the wireless LAN communication interface 914. Further, the antenna unit 130 may be implemented at the antenna 916.

Further, in the smartphone 900 illustrated in FIG. 19, the second control unit 463 described with reference to FIG. 12 may be implemented at the wireless LAN communication interface 914. Alternatively, the second control unit 463 may be implemented at the processor 901 and/or the secondary controller 922. As an example, a module including the wireless LAN communication interface 914, the processor 901 and/or the secondary controller 922 may be mounted on the smartphone 900, and the second control unit 463 may be implemented at the module. In this case, the above-described module may store a program for making the processor function as the second control unit 463 (in other words, a program for making the processor execute operation of the second control unit 463) and execute the program. As another example, a program (such as, for example, a device driver and an operating system (OS)) for making the processor function as the second control unit 463 may be installed in the smartphone 900, and the wireless LAN communication interface 914, the processor 901 and/or the secondary controller 922 may execute the program. As described above, the smartphone 900 or the above-described module may be provided as an apparatus including the second control unit 463, and the program for making the processor function as the second control unit 463 may be provided. Further, a readable storage medium having the above-described program stored therein may be provided.

It should be noted that, in the smartphone 900 illustrated in FIG. 19, the first wireless communication unit 420 described with reference to FIG. 12 may be implemented at the cellular communication interface 911. Further, the antenna unit 410 may be implemented at the antenna 913. Further, in the smartphone 900 illustrated in FIG. 19, the second wireless communication unit 440 described with reference to FIG. 12 may be implemented at the wireless LAN communication interface 914. Further, the antenna unit 430 may be implemented at the antenna 916.

Second Application Example

Figure 20:
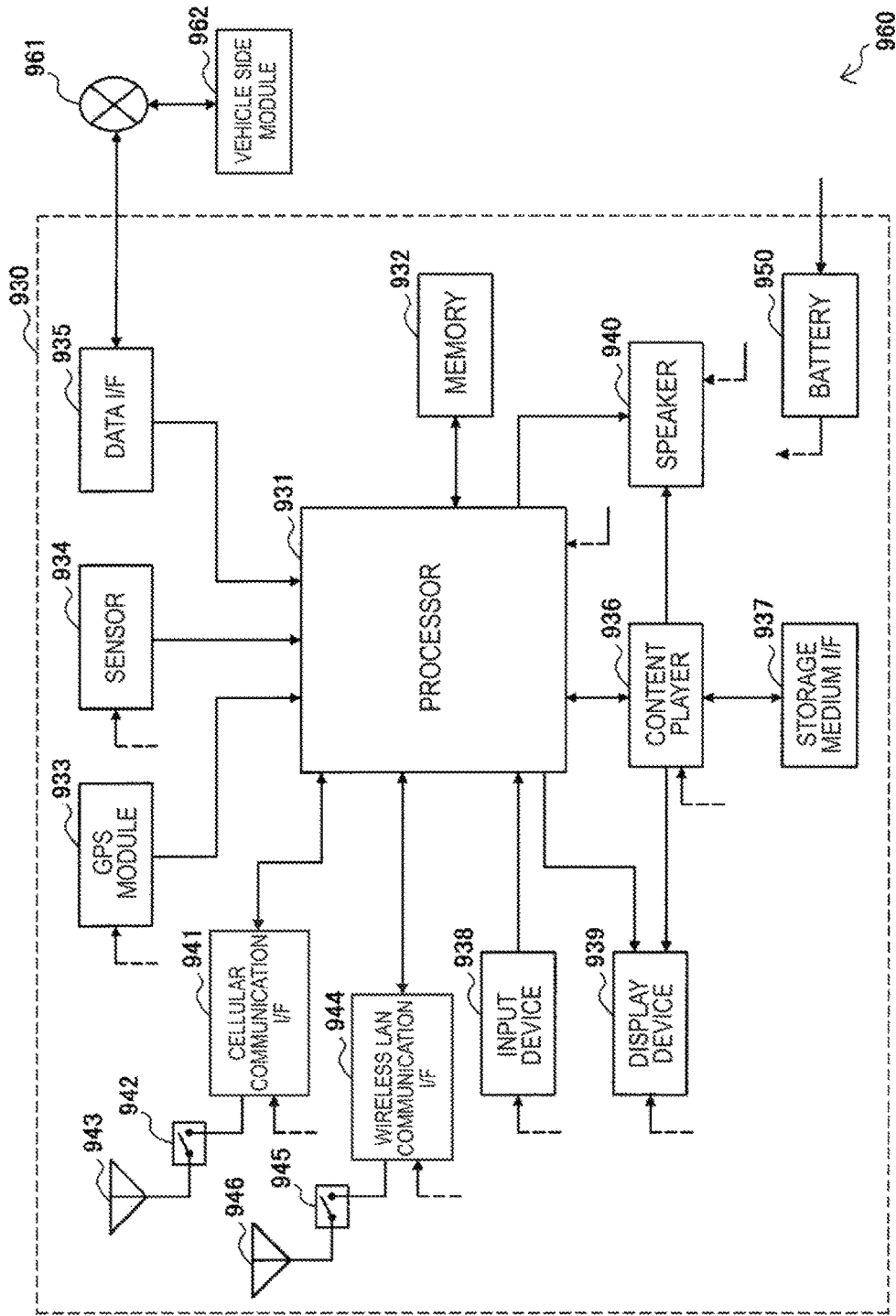
FIG. 20 is a block diagram illustrating an example of a schematic configuration of a car navigation apparatus.

FIG. 20 is a block diagram illustrating an example of a schematic configuration of a car navigation apparatus 930 to which the technology according to the present disclosure may be applied. The car navigation apparatus 930 includes a processor 931, a memory 932, a global positioning system (GPS) module 933, a sensor 934, a data interface 935, a content player 936, a storage medium interface 937, an input device 938, a display device 939, a speaker 940, a sellular communication interface 941, an antenna switch 942, an antenna 943, a wireless LAN communication interface 944, an antenna switch 945, an antenna 946, and a battery 950.

The processor 931 may be, for example, a CPU or an SoC, and controls the navigation function and the other functions of the car navigation apparatus 930. The memory 932 includes a RAM and a ROM, and stores a program executed by the processor 931 and data.

The GPS module 933 uses a GPS signal received from a GPS satellite to measure the position (e.g. latitude, longitude, and altitude) of the car navigation apparatus 930. The sensor 934 may include a sensor group including, for example, a gyro sensor, a geomagnetic sensor, and an air pressure sensor. The data interface 935 is, for example, connected to an in-vehicle network 961 via a terminal that is not illustrated, and acquires data such as vehicle speed data generated on the vehicle side.

The content player 936 reproduces content stored in a storage medium (e.g. CD or DVD) inserted into the storage medium interface 937. The input device 938 includes, for example, a touch sensor which detects that a screen of the display device 939 is touched, a button, or a switch, and accepts operation or information input from a user. The display device 939 includes a screen such as LCDs and OLED displays, and displays an image of the navigation function or the reproduced content. The speaker 940 outputs a sound of the navigation function or the reproduced content.

The cellular communication interface 941 supports any cellular communication scheme such as LTE and LTE-Advanced and executes wireless communication. The cellular communication interface 941 can typically include a BB processor, an RF circuit, or the like. The BB processor may, for example, perform encoding/decoding, modulation/demodulation, multiplexing/demultiplexing, or the like, and executes various kinds of signal processing for wireless communication. Meanwhile, the RF circuit can include a mixer, a filter, an amplifier, or the like, and transmits and receives a wireless signal via the antenna 943. The cellular communication interface 941 may be a one-chip module in which the BB processor and the RF circuit are integrated. The cellular communication interface 941 may include a single BB processor or a plurality of BB processors. Further, the cellular communication interface 941 may include a single RF circuit or a plurality of RF circuits. The antenna switch 942 switches a connection destination of the antenna 942 among a plurality of circuits included in the cellular communication interface 941. The antenna 943 has a single or a plurality of antenna elements (for example, a plurality of antenna elements constituting a MIMO antenna), and is used for transmission and reception of a wireless signal through the cellular communication interface 941.

The wireless LAN communication interface 944 supports one or more of wireless LAN standards such as IEEE802.11a, 11b, 11g, 11n, 11ac and 11ad, and executes wireless communication. The wireless LAN communication interface 944 can communicate with other apparatuses via the wireless LAN access point in the infrastructure mode. Further, the wireless LAN communication interface 944 can directly communicate with other apparatuses in the ad hoc mode. The wireless LAN communication interface 944 can typically include a BB processor, an RF circuit, or the like. The wireless LAN communication interface 944 may be a one-chip module in which a memory having a communication control program stored therein, a processor executing the program and related circuits are integrated. The antenna switch 945 switches a connection destination of the antenna 946 among a plurality of circuits included in the wireless LAN communication interface 944. The antenna 946 has a single or a plurality of antenna elements (for example, a plurality of antenna elements constituting a MIMO antenna), and is used for transmission and reception of a wireless signal through the wireless LAN communication interface 944.

As illustrated in FIG. 20, the car navigation apparatus 930 may have antennas respectively corresponding to the cellular communication interface 941 and the wireless LAN communication interface 944. It should be noted that, the car navigation apparatus 930 is not limited to the example of FIG. 20, and the car navigation apparatus 930 may have a shared antenna corresponding to the cellular communication interface 941 and the wireless LAN communication interface 944. As an example, the car navigation apparatus 930 may have a shared antenna and antenna switch corresponding to the cellular communication interface 941 and the wireless LAN communication interface 944 instead of including the antenna switch 942 and the antenna 943, and the antenna switch 945 and the antenna 946. The shared antenna may be connected to one of the cellular communication interface 941 and the wireless LAN communication interface 944 through the antenna switch.

Further, as illustrated in FIG. 20, the car navigation apparatus 930 may have the cellular communication interface 941 and the wireless LAN communication interface 944 as separate modules. It should be noted that the car navigation apparatus 930 is not limited to the example of FIG. 20, and the car navigation apparatus 930 may have a one-chip module including the cellular communication interface 941 and the wireless LAN communication interface 944. In this case, the car navigation apparatus 930 may include an antenna and an antenna switch shared between the communication interfaces, or may include antennas respectively corresponding to the communication interfaces.

It should be noted that the antenna switch 942 and the antenna switch 945 may be omitted from the configuration of the car navigation apparatus 930.

The battery 950 supplies electric power to each block of the car navigation apparatus 930 illustrated in FIG. 20 via a feeder line that is partially illustrated in the figure as a dashed line. The battery 950 accumulates the electric power supplied from the vehicle.

In the car navigation apparatus 930 illustrated in FIG. 20, the information acquiring unit 161 and the information providing unit 163 described with reference to FIG. 4 may be implemented at the processor 931. Alternatively, at least part of these components may be implemented at the cellular communication interface 941 and/or the wireless LAN communication interface 944. As an example, a program (such as, for example, a device driver and an OS) for making the processor function as the information acquiring unit 161 and the information providing unit 163 may be installed in the car navigation apparatus 930, and the processor 931, the cellular communication interface 941 and/or the wireless LAN communication interface 944 may execute the program. As another example, a module including the processor 931, part or all of the cellular communication interface 941 and/or part or all of the wireless LAN communication interface 944 may be mounted on the car navigation apparatus 930, and the information acquiring unit 161 and the information providing unit 163 may be implemented at the module. In this case, the above-described module may store a program for making the processor function as the information acquiring unit 161 and the information providing unit 163 (in other words, a program for making the processor execute operation of the information acquiring unit 161 and the information providing unit 163) and execute the program. As described above, the car navigation apparatus 930 or the above-described module may be provided as an apparatus including the information acquiring unit 161 and the information providing unit 163, and the program for making the processor function as the information acquiring unit 161 and the information providing unit 163 may be provided. Further, a readable storage medium having the above-described program stored therein may be provided.

It should be noted that, in the car navigation apparatus 930 illustrated in FIG. 20, the first wireless communication unit 120 described with reference to FIG. 4 may be implemented at the cellular communication interface 941. Further, the antenna unit 110 may be implemented at the antenna 943. Further, in the car navigation apparatus 930 illustrated in FIG. 20, the second wireless communication unit 140 described with reference to FIG. 4 may be implemented at the wireless LAN communication interface 944. Further, the antenna unit 130 may be implemented at the antenna 946.

Further, in the car navigation apparatus 930 illustrated in FIG. 20, the second control unit 463 described with reference to FIG. 12 may be implemented at the wireless LAN communication interface 944. Alternatively, the second control unit 463 may be implemented at the processor 931. As an example, a module including part or all of the wireless LAN communication interface 944 and/or the processor 931 may be mounted on the car navigation apparatus 930, and the second control unit 463 may be implemented at the module. In this case, the above-described module may store a program for making the processor function as the second control unit 463 (in other words, a program for making the processor execute operation of the second control unit 463) and execute the program. As another example, the program (such as, for example, a device driver and an OS) for making the processor function as the second control unit 463 may be installed in the car navigation apparatus 930, and the wireless LAN communication interface 944 and/or the processor 931 may execute the program. As described above, the car navigation apparatus 930 or the above-described module may be provided as an apparatus including the second control unit 463, and the program for making the processor function as the second control unit 463 may be provided. Further, a readable storage medium having the above-described program stored therein may be provided.

It should be noted that, in the car navigation apparatus 930 illustrated in FIG. 20, the first wireless communication unit 420 described with reference to FIG. 12 may be implemented at the cellular communication interface 941. Further, the antenna unit 410 may be implemented at the antenna 943. Further, in the car navigation apparatus 930 illustrated in FIG. 20, the second wireless communication unit 440 described with reference to FIG. 12 may be implemented at the wireless LAN communication interface 944. Further, the antenna unit 430 may be implemented at the antenna 946.

Further, the technique according to the present disclosure may be implemented as an in-vehicle system (or a vehicle) 960 including one or more blocks of the above-described car navigation apparatus 930, an in-vehicle network 961 and a vehicle side module 962. That is, the in-vehicle system (or the vehicle) 940 may be provided as an apparatus including the information acquiring unit 161 and the information providing unit 163 (or the second control unit 463). The vehicle side module 962 generates vehicle side data such as vehicle speed, engine speed and failure information and outputs the generated data to the in-vehicle network 961.

5. Conclusion

Each apparatus and each processing according to the embodiment of the present disclosure has been described above with reference to FIG. 1 to FIG. 20.

According to the embodiment according to the present disclosure, the wireless communication apparatus 100 includes an information acquiring unit 161 configured to acquire information (that is, communication related information) regarding another communication performed by the wireless communication apparatus 100 using a frequency band to be shared between wireless communication (for example, cellular communication) of the wireless communication system (for example, a cellular system) and the another wireless communication (for example, wireless LAN communication), and an information providing unit 163 configured to provide the above-described information (that is, communication related information) regarding the above-described another wireless communication (for example, wireless LAN communication) so that another apparatus (that is, the information processing apparatus 200) which determines an additional band which can be used for the above-described wireless communication (for example, cellular communication) of the above-described wireless communication system in addition to the frequency band (for example, a cellular band) for the above-described wireless communication system among the above-described frequency band to be shared can acquire the above-described information (that is, communication related information) regarding the above-described another wireless communication.

Further, according to the embodiment according to the present disclosure, the information processing apparatus 200 includes an information acquiring unit 233 configured to acquire information regarding another wireless communication performed by the wireless communication apparatus 100 using a frequency band (that is, a shared band) to be shared between wireless communication (for example, cellular communication) of the wireless communication system (for example, a cellular system) and the another wireless communication (for example, wireless LAN communication), the information (that is, communication related information) being provided by the wireless communication apparatus 100, and a control unit 235 configured to determine an additional band which can be used for the above-described wireless communication (for example, cellular communication) of the above-described wireless communication system in addition to the frequency band (for example, a cellular band) for the above-described wireless communication system among the above-described frequency band to be shared based on the above-described information regarding the above-described another wireless communication.

By this means, for example, it is possible to allow a wireless communication system to appropriately use a frequency band to be shared between wireless communication of the above-described wireless communication system and another wireless communication.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while an example has been described where the information processing apparatus and the base station are separate apparatuses, the present disclosure is not limited to this example. For example, the information processing apparatus may be implemented at the base station. More specifically, for example, the apparatus specifying unit, the information acquiring unit and the control unit of the information processing apparatus may be provided at the base station.

For example, while an example has been described where another wireless communication different from wireless communication of the wireless communication system is wireless LAN communication, the present disclosure is not limited to this example. For example, the above-described another wireless communication may be another wireless communication to which radio resources are not allocated (in other words, another wireless communication for which interference is dispersedly controlled). More specifically, for example, the above-described another wireless communication may be another wireless communication associated with carrier sense.

Further, it is not always necessary to execute the steps in the processing in the present specification in chronological order in order described in the flowcharts or the sequence diagrams. For example, the steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the information processing apparatus, the base station and/or the wireless communication apparatus) in the present specification function as the components of the above-described apparatuses (in other words, a computer program for making the processor execute operation of the components of the above-described apparatuses). Further, it is also possible to provide a storage medium having the above-described computer program stored therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An apparatus including:

an acquiring unit configured to acquire information regarding another wireless communication performed by a wireless communication apparatus using a frequency band to be shared between wireless communication of a wireless communication system and the another wireless communication, the information being provided by the wireless communication apparatus; and a control unit configured to determine an additional band available for the wireless communication of the wireless communication system in addition to a frequency band for the wireless communication system among the frequency band to be shared based on the information regarding the another wireless communication.

(2)

The apparatus according to (1), wherein the control unit determines the additional band and transmission power available for the additional band based on the information regarding the another wireless communication.

(3)

The apparatus according to (1) or (2), wherein the information regarding the another wireless communication includes information indicating a band used by the wireless communication apparatus among the frequency band to be shared.

(4)

The apparatus according to any one of (1) to (3), wherein the information regarding the another wireless communication includes information indicating transmission power of the wireless communication apparatus for the frequency band to be shared.

(5)

The apparatus according to any one of (1) to (4), wherein the information regarding the another wireless communication includes information indicating whether or not the wireless communication apparatus is using the frequency band to be shared.

(6)

The apparatus according to any one of (1) to (5), wherein the information regarding the another wireless communication is information routed through a base station of the wireless communication system.

(7)

The apparatus according to any one of (1) to (6), wherein the wireless communication apparatus is an apparatus located around a base station of the wireless communication system, and wherein the additional band is a band available for wireless communication of the base station.

(8)

The apparatus according to (7), further including:

a specifying unit configured to specify the wireless communication apparatus located around the base station based on a position of the wireless communication apparatus.

(9)

The apparatus according to (7) or (8), wherein the control unit determines the additional band based on the information regarding the another wireless communication and positions of the base station and the wireless communication apparatus.

(10)

The apparatus according to (7) or (8), wherein the control unit estimates interference of wireless communication of the base station to the another wireless communication of the wireless communication apparatus based on the information regarding the another wireless communication and determines the additional band based on the estimated interference.

(11)

The apparatus according to any one of (1) to (10), wherein the wireless communication system is a cellular system, and wherein the another wireless communication is wireless communication according to wireless local area network (LAN) standards.

(12)

An apparatus including:

an acquiring unit configured to acquire information regarding another wireless communication performed by a wireless communication apparatus using a frequency band to be shared between wireless communication of a wireless communication system and the another wireless communication; and a providing unit configured to provide the information regarding the another wireless communication in a manner that another apparatus which determines an additional band available for the wireless communication of the wireless communication system in addition to a frequency band for the wireless communication system among the frequency band to be shared is able to acquire the information regarding the another wireless communication.

(13)

The apparatus according to (12), wherein the acquiring unit further acquires position specifying information for specifying a position of the wireless communication apparatus, and wherein the providing unit provides the position specifying information in a manner that the another apparatus is able to specify the position of the wireless communication apparatus.

(14)

The apparatus according to (13)

wherein the position specifying information includes information generated by a global positioning system (GPS) function of the wireless communication apparatus.

(15)

The apparatus according to (13) or (14), wherein the position specifying information includes identification information of a cell of the wireless communication system in which the wireless communication apparatus is located.

(16)

The apparatus according to any one of (13) to (15), wherein the position specifying information includes information regarding received power of a signal at the wireless communication apparatus, the signal being transmitted by a plurality of base stations of the wireless communication system.

(17)

An apparatus including:

an acquiring unit configured to acquire information indicating an additional band available for wireless communication of a wireless communication system in addition to a frequency band for the wireless communication system among a frequency band to be shared between the wireless communication of the wireless communication system and another wireless communication; and a control unit configured to control a base station in a manner that the base station of the wireless communication system performs the wireless communication of the wireless communication system using the additional band, wherein the additional band is a band determined based on information regarding the another wireless communication performed by a wireless communication apparatus using the frequency band to be shared, the information being provided by the wireless communication apparatus.

(18)

The apparatus according to (17), wherein the control unit controls the base station to perform the wireless communication of the wireless communication system using the additional band at transmission power according to transmission power of the base station for the frequency band for the wireless communication system.

(19)

The apparatus according to (17) or (18), wherein the apparatus is the base station, a base station apparatus for the base station, or a module for the base station apparatus.

(20)

An apparatus including:

a control unit configured to control a wireless communication apparatus so as not to perform another wireless communication using an additional band while wireless communication of a wireless communication system is performed using the additional band available for the wireless communication of the wireless communication system among a frequency band to be shared between the wireless communication of the wireless communication system and the another wireless communication.

REFERENCE SIGNS LIST 1 communication system
10 wireless communication apparatus
30 cell
50 cellular band
60 shared band
63 additional band
100 information processing apparatus
161 information acquiring unit
163 information providing unit
200 information processing apparatus
231 apparatus specifying unit
233 information acquiring unit
235 control unit
300 base station
353 information acquiring unit
355 control unit
400 information processing apparatus
461 first control unit
463 second control unit

The invention claimed is:

1. An apparatus comprising:

processing circuitry configured to acquire receive position specifying information and communication related information regarding another wireless communication performed by a wireless communication apparatus using a frequency band to be shared between wireless communication of a wireless communication system and the another wireless communication, wherein the position specifying information and the communication related information are received from a base station communicably coupling the apparatus and the wireless communication apparatus, wherein the base station is configured to receive the position specifying information and the communication related information from the wireless communication apparatus, wherein the wireless communication apparatus is configured to acquire the position specifying information and the communication related information;

receive a request for an additional band for wireless communication of the wireless communication system in addition to the frequency band;

determine an additional band available for the wireless communication of the wireless communication system in addition to the frequency band for the wireless communication system among the frequency band to be shared based on the position specifying information and the communication related information regarding the another wireless communication, wherein determining the additional band includes specifying a wireless communication apparatus located around a base station based on a position of the wireless communication apparatus;

acquiring communication related information for the specified wireless communication apparatus;

estimating interference of wireless communication of the base station to another wireless communication of the wireless communication apparatus based on the communication related information and positions of the base station and the wireless communication apparatus; and determining the additional band and transmission power for the additional band based on the estimated interference;

transmit the additional band information indicating the determined band to the base station;

receive a communication parameter from the base station based on the additional band information transmitted to the base station; and update the communication parameter for the base station.

2. The apparatus according to claim 1, wherein the processing circuitry is further configured to determine the additional band and transmission power available for the additional band based on the position specifying information and the communication related information regarding the another wireless communication.

3. The apparatus according to claim 1, wherein the position specifying information and the communication related information regarding the another wireless communication includes information indicating a band used by the wireless communication apparatus among the frequency band to be shared.

4. The apparatus according to claim 1, wherein the position specifying information and the communication related information regarding the another wireless communication includes information indicating transmission power of the wireless communication apparatus for the frequency band to be shared.

5. The apparatus according to claim 1, wherein the position specifying information and the communication related information regarding the another wireless communication includes information indicating whether or not the wireless communication apparatus is using the frequency band to be shared.

6. The apparatus according to claim 1,
wherein the wireless communication system is a cellular system, and
wherein the another wireless communication is wireless communication according to wireless local area network (LAN) standards.

7. An apparatus comprising:
processing circuitry configured to
receive position specifying information and communication related information regarding another wireless communication performed by a wireless communication apparatus using a frequency band to be shared between wireless communication of a wireless communication system and the another wireless communication, wherein the position specifying information and the communication related information are received from a base station communicably coupling the apparatus and the wireless communication apparatus, wherein the base station is configured to receive the position specifying information and the communication related information from the wireless communication apparatus, wherein the wireless communication apparatus is configured to acquire the position specifying information and the communication related information,
receive a request for an additional band for wireless communication of the wireless communication system in addition to the frequency band,
determine an additional band available for the wireless communication of the wireless communication system in addition to the frequency band for the wireless communication system among the frequency band to be shared based on the position specifying information and the communication related information regarding the another wireless communication, wherein determining the additional band includes
specifying a wireless communication apparatus located around a base station based on a position of the wireless communication apparatus,
acquiring communication related information for the specified wireless communication apparatus,
estimating interference of wireless communication of the base station to another wireless communication of the wireless communication apparatus based on the communication related information and positions of the base station and the wireless communication apparatus, and
determining the additional band and transmission power for the additional band based on the estimated interference,
control the wireless communication apparatus so as not to perform another wireless communication using the additional band while wireless communication of the wireless communication system is performed using the additional band available for the wireless communication of the wireless communication system among the frequency band to be shared between the wireless communication of the wireless communication system and the another wireless communication,
transmit the additional band information indicating the determined band to the base station;
receive a communication parameter from the base station based on the additional band information transmitted to the base station; and
update the communication parameter for the base station.

* * * * *